(12) United States Patent
Sridhar et al.

(10) Patent No.: US 11,206,291 B2
(45) Date of Patent: *Dec. 21, 2021

(54) SESSION CONTROL LOGIC WITH INTERNET PROTOCOL (IP)-BASED ROUTING

(71) Applicant: T-Mobile USA, Inc., Bellevue, WA (US)

(72) Inventors: Tharunika Sridhar, Redmond, WA (US); Rex Maristela, Renton, WA (US); Muhilan Vamadevan, Bellevue, WA (US); Rahul Amin, Issaquah, WA (US); Joel Arends, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/993,884

(22) Filed: Aug. 14, 2020

(65) Prior Publication Data

US 2020/0374321 A1 Nov. 26, 2020

Related U.S. Application Data

(63) Continuation of application No. 16/012,563, filed on Jun. 19, 2018, now Pat. No. 10,757,144.

(51) Int. Cl.
*H04L 29/06* (2006.01)
*H04L 29/12* (2006.01)
*H04W 8/26* (2009.01)

(52) U.S. Cl.
CPC .... *H04L 65/1006* (2013.01); *H04L 29/06197* (2013.01); *H04L 29/06326* (2013.01); *H04L 61/103* (2013.01); *H04W 8/26* (2013.01)

(58) Field of Classification Search
CPC ........... H04L 65/1006; H04L 29/06197; H04L 29/06326; H04L 61/103; H04W 8/26
(Continued)

(56) References Cited

U.S. PATENT DOCUMENTS

2004/0132429 A1* 7/2004 Gill ....................... H04L 69/329
455/412.1
2006/0068753 A1 3/2006 Karpen et al.
(Continued)

OTHER PUBLICATIONS

Office Action for U.S. Appl. No. 16/012,563, dated Jan. 30, 2020, Sridhar, "Session Control Logic With Internet Protocol (IP)-Based Routing", 24 Pages.
(Continued)

*Primary Examiner* — James E Springer
(74) *Attorney, Agent, or Firm* — Lee & Hayes, P.C.

(57) ABSTRACT

Disclosed is an architecture that distributes session control logic across multiple points of a telecommunications network. Also disclosed are techniques and systems using Internet Protocol (IP)-based routing to establish communication sessions. A user equipment (UE) may receive user input to initiate a communication session, derive a destination IP address, generate a session request having at least the destination IP address, and send the session request a server. The server may receive the session request from the UE, replace the destination IP address in the session request with an IP address of an endpoint device to generate a modified session request, and route the modified session request to the endpoint device based at least in part on the IP address of the endpoint device.

20 Claims, 21 Drawing Sheets

(58) Field of Classification Search
USPC .......................................................... 709/228
See application file for complete search history.

(56) References Cited

U.S. PATENT DOCUMENTS

| | | |
|---|---|---|
| 2007/0192508 A1 | 8/2007 | Sollee |
| 2007/0217595 A1* | 9/2007 | Lee .................... H04M 1/2535 |
| | | 379/219 |
| 2008/0009303 A1 | 1/2008 | Westman et al. |
| 2008/0195753 A1 | 8/2008 | Shimada |
| 2009/0280770 A1 | 11/2009 | Mahendran |
| 2010/0064034 A1 | 3/2010 | Nitta |
| 2011/0302289 A1* | 12/2011 | Shaikh .............. H04L 29/12283 |
| | | 709/223 |
| 2014/0334497 A1 | 11/2014 | Tanimoto |
| 2015/0296058 A1 | 10/2015 | Jalan et al. |
| 2015/0327027 A1 | 11/2015 | Peng et al. |
| 2016/0323180 A1 | 11/2016 | Kamboh |
| 2019/0014525 A1 | 1/2019 | Jin et al. |
| 2019/0387030 A1 | 12/2019 | Sridhar et al. |

OTHER PUBLICATIONS

Non Final Office Action dated Jul. 29, 2019 for U.S. Appl. No. 16/012,563 "Session Control Logic With Internet Protocol (IP)-Based Routing" Sridhar, 15 pages.

Rosenberg, et al., "SIP: Session Initiation Protocol", retrieved at «https://tools.ietf.org/html/rfc3261» , The Internet Society , Jun. 2002, 269 pgs.

* cited by examiner

SESSION CONTROL LOGIC WITH INTERNET PROTOCOL (IP)-BASED ROUTING

RELATED APPLICATIONS

This application is a continuation of and claims priority to U.S. patent application Ser. No. 16/012,563, filed on Jun. 19, 2018, titled, "SESSION CONTROL LOGIC WITH INTERNET PROTOCOL (IP)-BASED ROUTING," the entirety of which is incorporated herein.

BACKGROUND

The Internet Protocol Multimedia Subsystem (IMS) is an architectural framework that delivers multimedia over an Internet Protocol (IP) transport and uses Session Initiation Protocol (SIP) as a session control protocol. The IMS architecture can be defined according to multiple layers including a user equipment (UE)/device layer, a transport layer, a control layer, and an application (or service) layer.

The control layer of the IMS is made up of various network nodes, including call session control function (CSCF) nodes, media gateway control function (MGCF) nodes, border gateway control function (BGCF) nodes, and other nodes. These network nodes are configured to work together (e.g., by routing packets from one node to another) to provide session control for multimedia sessions that are established over packet networks. This design is quite complex, and it requires significant overhead in computing resources to implement. For example, in a typical voice over IP (VOIP) call flow, a SIP message—as it travels from an origin to a destination—is typically processed, parsed, and inspected by various control layer nodes including an access session border controller (A-SBC), an interconnection SBC (I-SBC), a proxy CSCF (P-CSCF) node, an interrogating CSCF (I-CSCF) node, a serving CSCF (S-CSCF) node, a MGCF node, a BGCF node, a telephony application server (TAS), and multiple application servers (AS's). Moreover, the SIP message is subjected to various queries and evaluation criteria as it traverses these network nodes. Accordingly, today's IMS control layer architecture is suboptimal in terms of its utilization of computing resources and the deployment effort and the operations, administration, and management (OAM) effort that is required to synchronize SIP headers and parameters across the various nodes of the IMS control layer.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
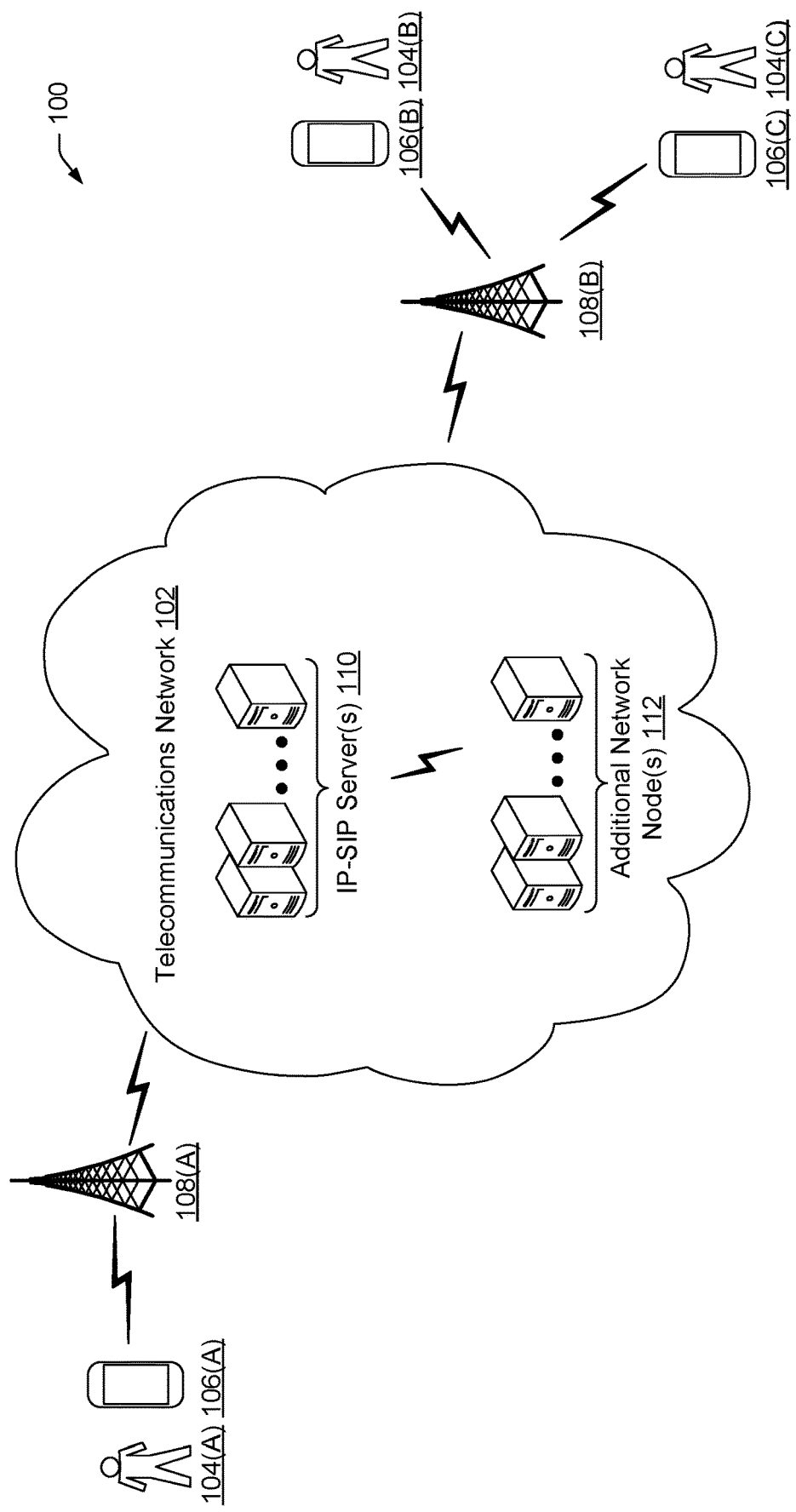
FIG. 1 illustrates an example environment that includes an IP-SIP server for implementing session control logic, and that leverages registered UEs to implement a portion of the session control logic.

Described herein are techniques and systems for distributing session control logic of the IMS core across multiple points of the telecommunications network, and for using IP-based routing to establish communication sessions over packet networks. The techniques described herein leverage available compute power of UEs that register for IMS-based services by having the registered UEs implement a portion of the session control logic upon a request to establish a communication session. Meanwhile, an IP-SIP server (sometimes referred to herein generally as a "server") implements a remainder of the session control logic on the network side. This control layer architecture eliminates many of the existing control layer nodes of the IMS core to create a simplified architecture for implementing control layer functionality in a telecommunications network. The elimination of many of the existing control layer nodes of today's IMS architecture is likely to spawn rapid new application development, and is also likely to conserve resources for the deployment and management of such systems. The techniques and systems described herein may also result in an end-to-end "cloudification" of IMS network functions, which is no longer bounded by a static infrastructure and pseudo virtualization. Rather, the session control architecture described herein is a true "anytime and anywhere" technology that can advertise services using IP addresses (e.g., uniform resource locators (URLs) containing IP addresses) as endpoints.

In some embodiments, an example process to be implemented by a UE includes receiving user input to initiate a communication session, deriving a destination IP address (e.g., deriving the destination IP address based at least in part on a mobile station international subscriber directory number (MSISDN) associated with the user input), generating a session request (e.g., a SIP request) having at least the destination IP address, and sending the session request over a telecommunications network to a server for establishing the communication session with an endpoint device. Thus, session control logic is partly distributed to the requesting UE by having the UE algorithmically generate the destination IP address that is included in the session request.

In some embodiments, an example process to be implemented on one or more servers (e.g., IP-SIP server(s)) includes receiving, from a user equipment (UE) over a telecommunications network, a session request (e.g., a SIP request) to establish a communication session, replacing a destination IP address in the session request with an IP address (e.g., a physical (PHY) IP address) of an endpoint device to generate a modified session request, and routing, over the telecommunications network, the modified session request to the endpoint device based at least in part on the IP address of the endpoint device. This IP-based routing is a streamlined approach, as compared to existing session control logic. This is at least because the IP-based routing techniques can eliminate many of the control layer nodes that are implemented today for purposes of routing SIP requests from one network node to another.

Also disclosed herein are systems comprising one or more processors and one or more memories, as well as non-transitory computer-readable media storing computer-executable instructions that, when executed, by one or more processors perform various acts and/or processes disclosed herein.

FIG. 1 illustrates an example environment 100 that includes an IP-SIP server for implementing session control logic, and that leverages registered UEs to implement a portion of the session control logic. The environment 100 may include a telecommunications network 102, which can be maintained and/or operated by one or more service providers, such as one or more wireless carriers (sometimes referred to as "operators"). The service provider(s) may provide IMS-based services to users 104 (sometimes called "subscribers"). The users 104 may utilize UEs 106 to access the IMS-based services to which they have subscribed. For example, a service provider may offer multimedia telephony services that allow a first user 104(A) (e.g., a subscribed user) to call or message other users (e.g., a second user 104(B) and/or a third user 104(C)) via the telecommunications network 102 using his/her UE 106(A). A first user 104(A) can also utilize an associated UE 106(A) to receive, provide, or otherwise interact with various different IMS-based services by accessing the telecommunications network 102. In this manner, a carrier may offer any type of IMS-based service(s), such as telephony services (or voice calling), emergency services (e.g., E911), gaming services, instant messaging services, presence services, video conferencing services, social networking and sharing services, location-based services, push-to-talk services, WiFi calling services, real time text (RTT) calling services, RTT video calling services, and so on. In order to access one or more of these services, a UE 106 is configured to register for the services and request establishment of a communication session to access the services. Although many of the examples described herein relate to voice calling services, it is to be appreciated that the UE 106 may request establishment of any type of communication session.

In accordance with various embodiments described herein, the terms "user equipment (UE)," "communication device," "device," "wireless communication device," "wireless device," "mobile device," "terminal," "endpoint device," "wireless terminal," "mobile terminal," and "client device," may be used interchangeably herein to describe any UE 106 (e.g., any of the Us 106(A), 106(B), and 106(C) shown in FIG. 1) that is capable of transmitting/receiving data, wirelessly and/or over wired networks, using any suitable communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), voice over New Radio (VoNR)—e.g., 5G, IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

Although the UEs 106 are shown as mobile phones or handsets in FIG. 1, the UEs 106 described herein can be implemented as any suitable type of communication device configured to communicate over a telecommunications network 102, including, without limitation, a mobile phone (e.g., a smart phone) or a handset, a tablet computer, a laptop computer, a portable digital assistant (PDA), a wearable computer (e.g., electronic/smart glasses, a smart watch, fitness trackers, etc.), an in-vehicle (e.g., in-car) computer, and/or any similar communication device. Accordingly, a UE 106 may be a mobile device, or the UE 106 may, alternatively, be a non-mobile (or situated) communication device including, without limitation, a television (smart television), a set-top-box (STB), a game console, a desktop computer, and the like.

FIG. 1 shows that the UE's 106 can access the telecommunications network 102 via radio access networks (RANs) 108, which may be associated with any suitable radio access technology (RAT), such as a 5G RAT, a 4G LTE RAT, and/or any future or legacy RAT, etc. Although the RANs 108(A)

and 108(B) are depicted in FIG. 1 as cell towers (e.g., eNodeB RANs), it is to be appreciated that the RANs 108 can be implemented as other types of RANs, such as wireless access points (APs) (e.g., WiFi routers used for WiFi calling, etc.), and the like. The RANs 108 may be considered to be part of the telecommunications network 102, or the RANs 108 may be considered to be separate from the telecommunications network 102. The RANs 108 provide a physical wireless link between the UEs 106 and the various network nodes of the telecommunications network 102. The RANs 106 may employ private and/or public (e.g., the Internet) networks to connect to the telecommunications network 102. It is to be appreciated that the telecommunications network 102 may further include, without limitation, a backhaul network, and/or other network elements that may facilitate access to the telecommunications network 102.

FIG. 1 further illustrates that the telecommunications network 102 may include IP-SIP server(s) 110 (sometimes referred to herein generally as "server(s)" 110). The IP-SIP server(s) 110 may be implemented as a multifunctional node(s) that acts as a primary control layer node of the telecommunications network 102, and which enables an end-to-end IMS "cloud" that is accessible using IP addresses as service endpoints. The IP-SIP server(s) 110 may be configured to, among other things, advertise services using IP addresses, provide registration services to UEs 106, maintain association data that associates IP addresses to various other data, and/or to route incoming SIP requests (e.g., packets) to appropriate endpoints based on destination IP addresses included in the incoming SIP requests. Additional network nodes 112 may be available to the IP-SIP server(s) 110 for assisting the IP-SIP server(s) 110 in the provisioning of various services described herein. For example, the additional network nodes 112 may include conference application servers (AS's) to enable conference calling services between three or more UEs 106, an emergency CSCF (E-CSCF) node to enable the provisioning of emergency services (e.g., E911), and other suitable nodes that handle particular functionality of the associated services.

Figure 2:
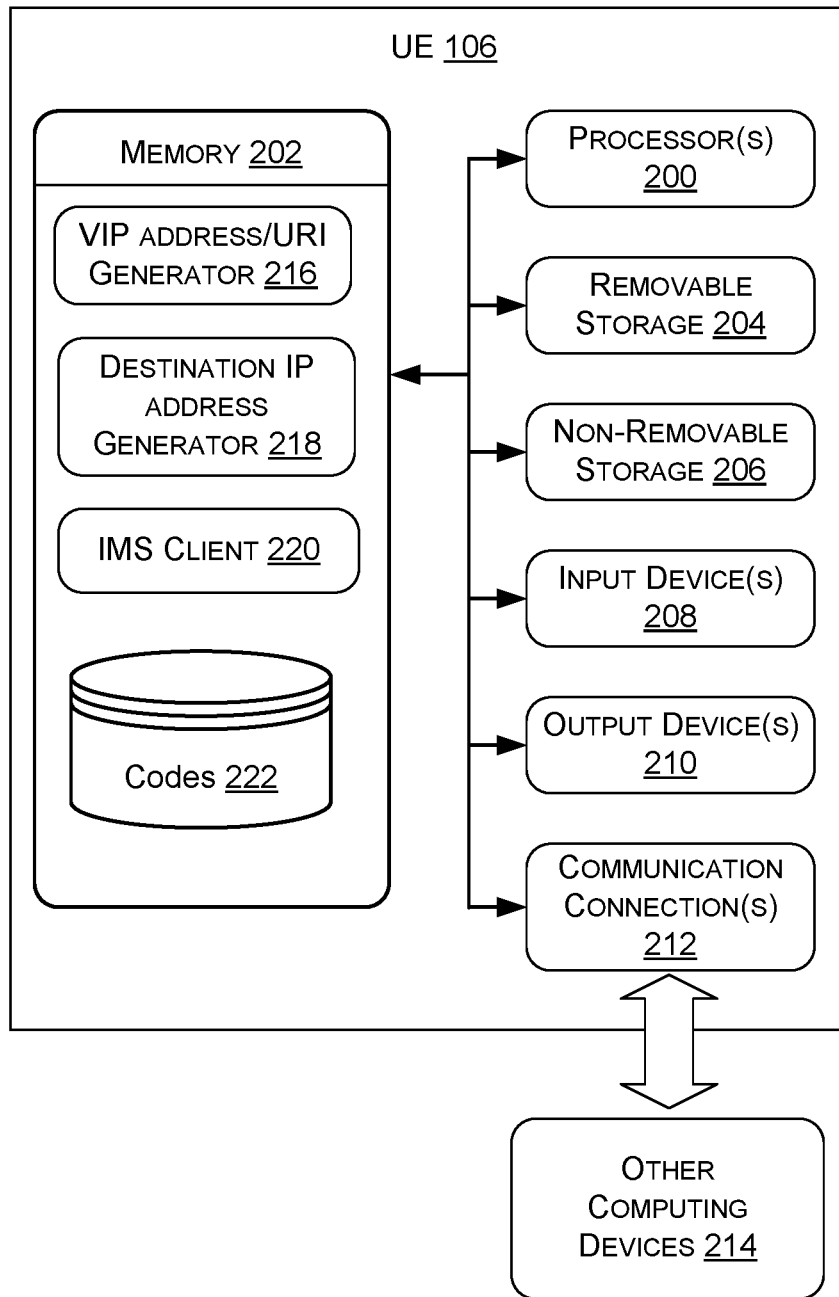
FIG. 2 is a block diagram of an example UE architecture in accordance with various embodiments.

FIG. 2 is a block diagram of an example UE 106 architecture in accordance with various embodiments. As shown, the UE 106 may include one or more processors 200 and one or more forms of computer-readable memory 202. The UE 106 may also include additional storage devices. Such additional storage may include removable storage 204 and/or non-removable storage 206.

The UE 106 may further include input devices 208, including, without limitation, a touch screen (e.g., touch, or proximity-based) display, physical buttons (e.g., keyboard or keypad), a camera-based sensor configured to receive gestural input from a user, a microphone or microphone array for receiving voice input commands from a user, pointing devices (e.g., mouse, pen, stylus, etc.), or any other suitable input devices 208 coupled communicatively to the processor(s) 200 and the computer-readable memory 202. The UE 106 may further include output devices 210, including, without limitation, a display, speakers, a printer, or any other suitable output device coupled communicatively to the processor(s) 200 and the computer-readable memory 202.

The UE 106 may further include communications connection(s) 212 that allow the UE 106 to communicate with other computing devices 214, such as other UEs 106 and/or application servers (AS's) via a network (e.g., via the telecommunications network 102 of FIG. 1). The communications connection(s) 212 may facilitate transmitting and receiving wireless signals over any suitable wireless communications/data technology, standard, or protocol, as described above, such as using licensed, semi-licensed, or unlicensed spectrum over a telecommunications network 102. For example, the communication connection(s) 212 may represent one or more of a cellular radio, a wireless (e.g., IEEE 802.1x-based) interface, a Bluetooth® interface, and so on.

In various embodiments, the computer-readable memory 202 comprises non-transitory computer-readable memory 202 that generally includes both volatile memory and nonvolatile memory (e.g., random access memory (RAM), read-only memory (ROM), erasable programmable readonly memory (EEPROM), Flash Memory, miniature hard drive, memory card, optical storage, magnetic cassettes, magnetic tape, magnetic disk storage or other magnetic storage devices, or any other medium). The computer-readable memory 202 may also be described as computer storage media and may include volatile and nonvolatile, removable and non-removable media implemented in any method or technology for storage of information, such as computer readable instructions, data structures, program modules, or other data. Computer-readable memory 202, removable storage 204 and non-removable storage 206 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the UE 106. Any such computer-readable storage media may be part of the UE 106.

In some embodiments, the computer-readable memory 202 may include a virtual IP (VIP) address/uniform resource identifier (URI) generator 216, a destination IP address generator 218, and an IMS client 220, among other possible modules, data structures, and/or processor-readable instructions. Furthermore, the computer-readable memory 202 is shown as maintaining codes 222, which may be utilized for registration and/or for establishment of communication sessions and related services via the IP-SIP server(s) 110. The codes 222 maintained by the UE 106 may correspond to a network services mapping table that is maintained by the IP-SIP server(s) 110, as described in more detail below. Collectively, the codes 222 and the components 216, 218, and 220 allow for leveraging the computing resources of the UE 106 to implement a portion of the control layer logic for session control. For example, the UE 106 is configured to generate VIP addresses and URIs for the UE 106, to generate destination IP addresses of other registered UEs 106, and to generate SIP messages (e.g., including headers and other parameters) based on the codes 222 and using the components 216, 218, and 220.

Figure 3:
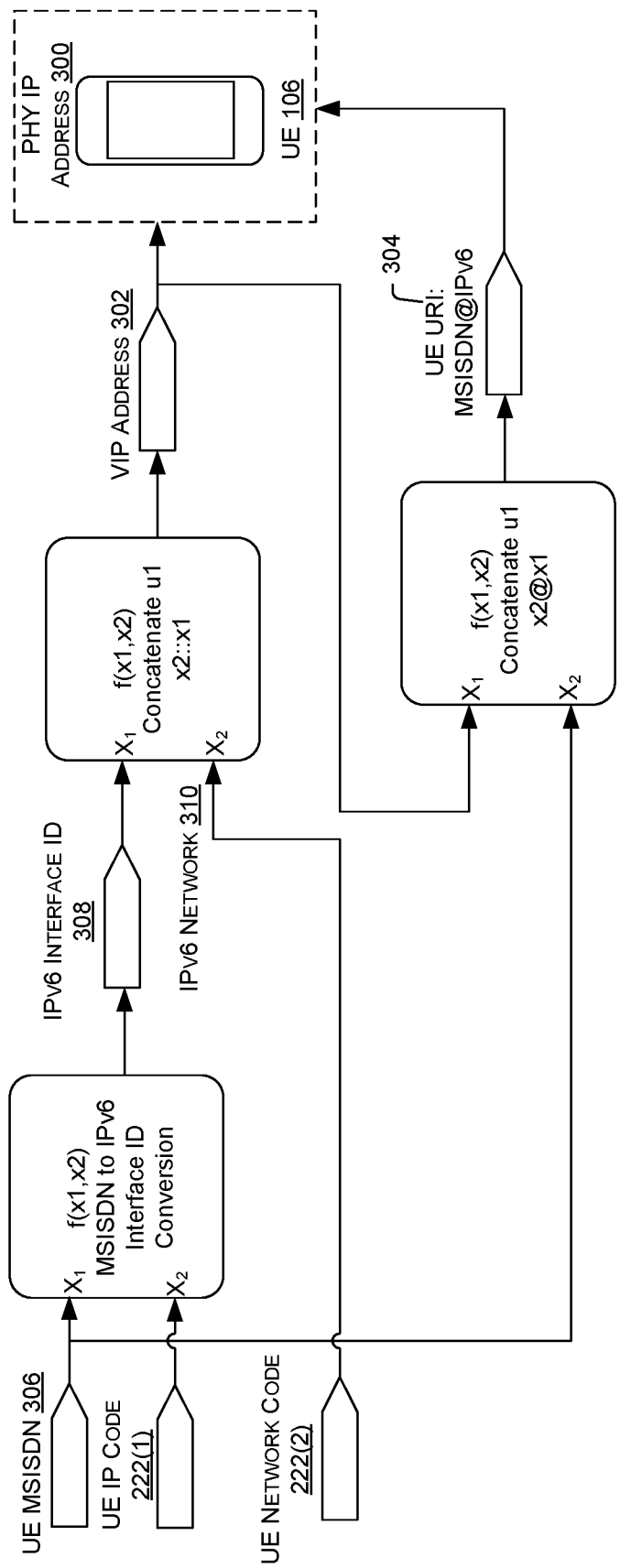
FIG. 3 shows an example UE algorithm to generate a virtual IP (VIP) address and a uniform resource identifier (URI) for a UE.

The UE 106 may be associated with at least two IP addresses. A first IP address associated with the UE 106 may be assigned by a service provider that provides IMS-based services over the telecommunications network 102. This first IP address of the UE 106 may correspond to a physical (PHY) IP address 300 of the UE 106, which is shown in FIG. 3. A second IP address associated with the UE 106 may be algorithmically generated by the UE 106 using the codes 222, and this second IP address may correspond to a virtual IP (VIP) address 302 of the UE 106, which is also shown in FIG. 3.

FIG. 3 shows an example UE algorithm to generate a VIP address 302 and a URI 304 for a UE 106. The VIP address/URI generator 216 may be configured to implement the algorithm of FIG. 3 to generate a VIP address and/or a URI for the UE 106, and/or to deterministically generate a VIP address and/or a URI of any other registered UE.

As shown in FIG. 3, the UE 106 is associated with a mobile station international subscriber directory number (MSISDN) 306, which may be a number that uniquely identifies a subscription (e.g., a subscription of a subscribing user 104). As mentioned, the UE 106 may also maintain codes 222, which the UE 106 may have received over a network (e.g., over the telecommunications network 102) from the IP-SIP server(s) 110 at an earlier point in time. In an example, the UE 106 may download the codes 222 via an application update, which may be received (e.g., pushed or pulled) automatically, periodically, and/or in response to user input for updating the software on the UE 106. The codes 222 may include multiple different types of codes including, for example, a UE IP code 222(1) and a UE network code 222(2) (other types of codes are described below with reference to FIG. 5).

The UE IP code 222(1) may be used to generate a first portion 308 of a VIP address 302 for a given UE 106. For example, the UE IP code 222(1) and the MSISDN 306 can be used to generate the first portion 308 of the VIP address 302, which may correspond to an interface identifier (ID) portion (e.g., an IP version 6 (IPv6) interface ID) of the VIP address 302. "Interface ID" may be used interchangeably herein with "host ID," "host portion," or "interface portion" to represent the first portion 308 of the VIP address 302. Although many of the examples presented herein utilize IPv6 (which provides an ample number of bits to implement the techniques described herein), it is to be appreciated that other protocols/versions can be utilized with the techniques and systems described herein, such as IP version 4 (IPv4), and other protocols. Furthermore, the IP addresses and routes described herein are merely examples, and any IP scheme can be used with the techniques and systems herein, without changing the basic characteristics of the system.

The UE network code 222(2) may be used to generate a second portion 310 of the VIP address 302 for the given UE 106. This second portion 310 of the VIP address 302 may correspond to a network portion (e.g., an IPv6 network, or the 64 bits for the Network, that is assigned to the UE 106) of the VIP address 302. The first portion 308 of the VIP address 302 may be 64 bits, and the second portion 310 of the VIP address 302 may be 64 bits, which accommodates a 128-bit VIP address 302. In some embodiments, the VIP address 302 may be a concatenation of the UE network code 222 (corresponding to the second portion 310 of the VIP address 302) and the first portion 308 of the VIP address 302 (which is based on the MSISDN 306 and the UE IP code 222(1)).

As shown in FIG. 3, the VIP address 302 generated for the UE 106 may be used along with the MSISDN 306 to generate a URI 304 for the UE 106. In some embodiments, the URI 304 may be a concatenation of the VIP address 302 and the MSISDN 306 (e.g., MSISDN@IPv6). In some embodiments, the VIP address 302 can be determined algorithmically for any UE 106, and the VIP address 302 can be used a destination IP address in a session request, as will be described in more detail below. For example, the destination IP address 500 discussed with respect to FIG. 5, below, may, in some embodiments, represent a VIP address 302 of a second UE 106(B) with which a first UE 106(A) is establishing a communication session.

Figure 4:
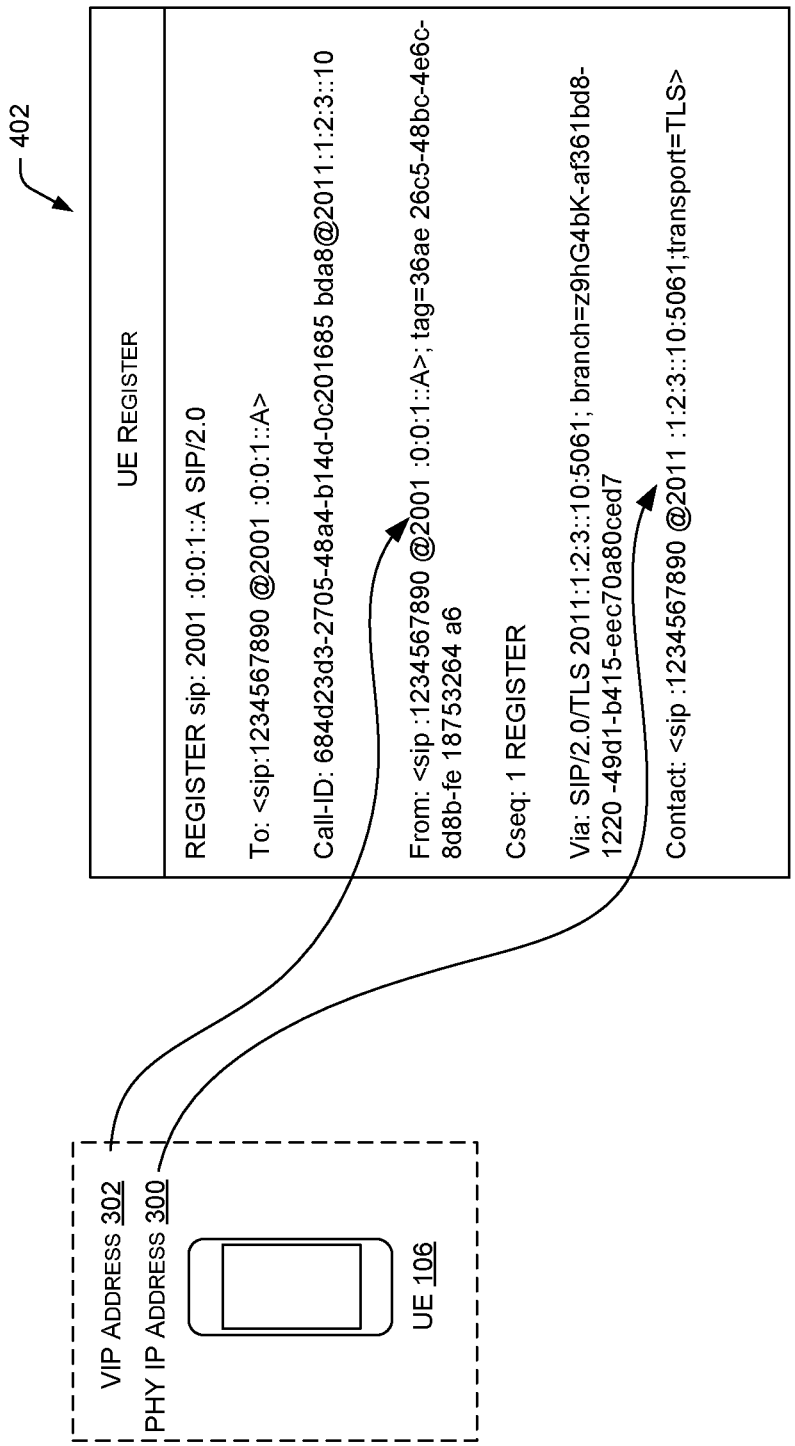
FIG. 4 shows an example technique for generating a registration message at a UE based on a virtual IP (VIP) address and a physical (PHY) IP address.

FIG. 4 shows an example registration request 402 that may be generated by the UE 106 based on a VIP address 302 and a PHY IP address 300 of the UE 106. As mentioned above, the UE 106 may be associated with at least two IP addresses: the PHY IP address 300 assigned by a service provider (e.g., a wireless carrier), and the VIP address 302, which is algorithmically generated by the UE 106 using the codes 222, such as using the algorithm described with reference to FIG. 3. Accordingly, the IMS client 220 of the UE 106 may be configured to register for, and thereafter access and utilize, one or more IMS-based services by sending a registration request 402 (or registration message), which may utilize SIP protocol and may include the VIP address 302 and the PHY IP address 300 of the UE 106.

SIP is a signaling protocol that can be used to establish, modify, and terminate multimedia sessions over packet networks, and to authenticate access to IMS-based services. SIP has been standardized by the Internet Engineering Task Force (IETF). As used herein, a "SIP request" is a message that is sent from a UE 106 to the IP-SIP server(s) 110 using SIP protocol. As used herein, a "SIP response" is a message that is sent from the IP-SIP server(s) 110 to a UE 106 using SIP protocol. Thus, the registration request 402 may be considered a SIP request because the registration request 402 is sent from the UE 106 to the IP-SIP server(s) 110 using SIP protocol.

As shown in FIG. 4, the UE 106 may generate the registration request 402 by inserting the VIP address 302 and the PHY IP address 300 into the registration request 402. Upon receipt of the registration request 402 at the IP-SIP server(s) 110, the IP-SIP server(s) 110 can extract the VIP address 302 and/or the PHY IP address 300 from the registration request 402, and use the VIP address 302 and/or the PHY IP address 300 to create an entry for the UE 106 in a registration state table, as described in more detail below. The VIP address 302 and/or the PHY IP address 300 can thereafter be used by the IP-SIP server(s) 110 for purposes of routing SIP requests to an appropriate destination, as described in more detail below.

Figure 5:
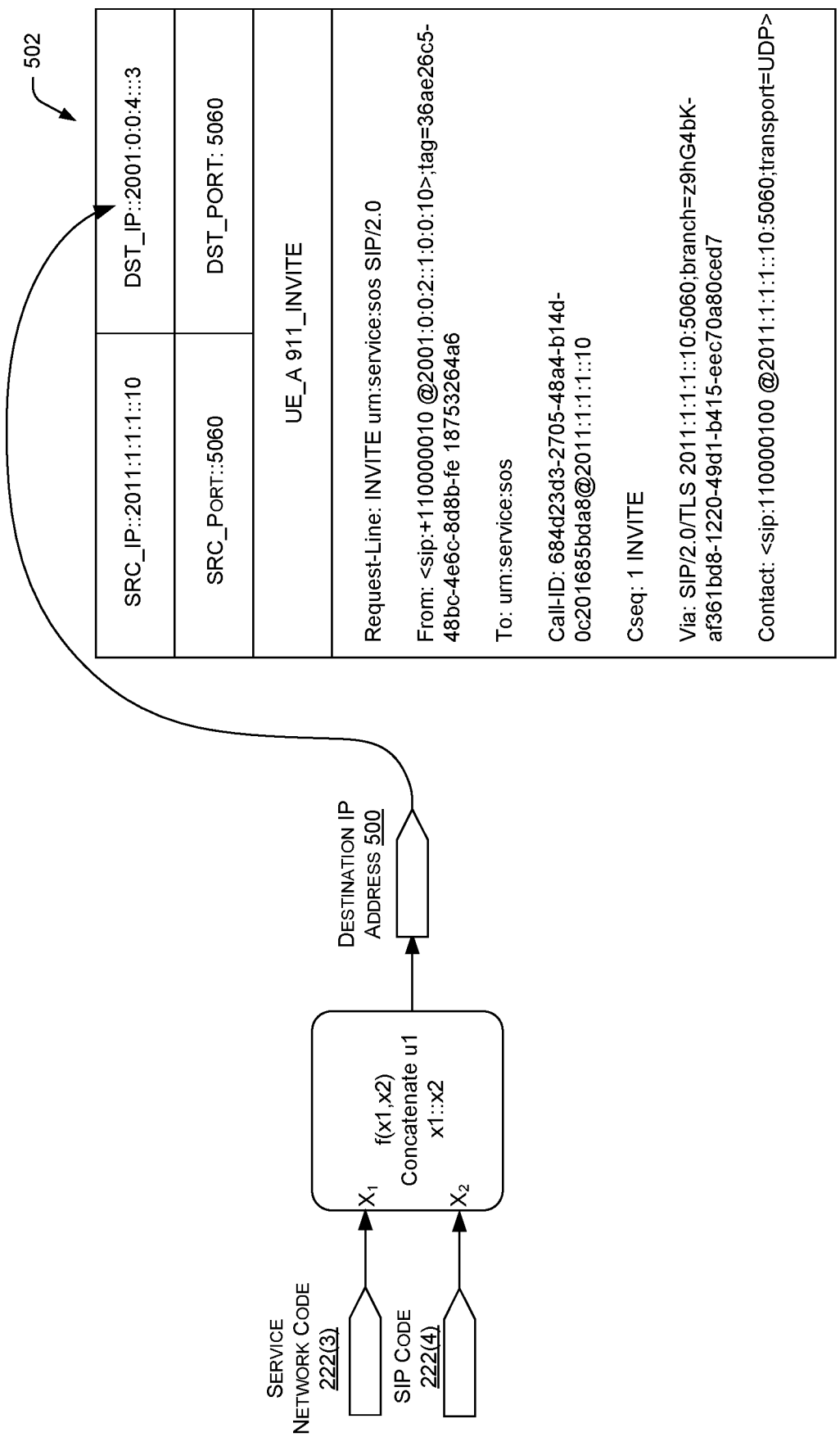
FIG. 5 shows an example UE algorithm to generate a destination IP address to which the UE can send a SIP message (e.g., SIP request) based on a requested service.

FIG. 5 shows an example UE algorithm that may be implemented by the destination IP address generator 218 of the UE 106 to generate a destination IP address 500. The UE 106 can then send a SIP request to the destination IP address 500 based on a requested service. The example of FIG. 5 shows a scenario where a destination IP address 500 is generated for an Emergency 911 (E-911) call service. However, it is to be appreciated that the destination IP address 500 may, in some embodiments, correspond to a VIP address 302 of a second UE 106(B) with which the first UE 106(A) may be trying to establish a communication session (e.g., a voice call) that is not emergency related. This example is described below at least with respect to FIG. 11.

As mentioned above, the UE 106 can maintain codes 222, which may have been received over a network (e.g., over the telecommunications network 102) from the IP-SIP server(s) 110 at an earlier point in time. In the example of FIG. 5, two additional types of codes 222 are shown, including, for example, a service network code 222(3), and a SIP code 222(4). The service network code 222(3) is a type of code that indicates (or corresponds to) particular service(s) that the UE 106 can request via a SIP request 502 (e.g., a session request, such as a SIP INVITE). In an illustrative example, the service network code 222(3) may form a first portion (e.g., network portion) of the destination IP (e.g., IPv6) address 500 that is to be included in a SIP request 502 sent by the UE 106 to the IP-SIP server(s) 110 over the telecommunications network 102. The IP-SIP server(s) 110 can use this service network code 222(3) (e.g., the network portion of the destination IP address 500) to route the SIP request 502 (or packets that make up the SIP request 502) to an appropriate endpoint, as described in more detail below. Because there are multiple types/categories of network services (e.g., IMS-based services), each type of service may be assigned a particular service network code 222(3) (e.g., the 64 bits for the Network). In the example of FIG. 5, the service network code 222(3) may correspond to an E-911 service, and may be used to generate a destination IP address 500 that the IP-SIP server(s) 110 can use to route the SIP request 502 to the nearest public safety answering point (PSAP) (e.g., a PSAP that is closest to a location associated with the UE 106).

The SIP code 222(4) may form a second portion (e.g., an interface ID portion) of the destination IP (e.g., IPv6) address 500. In some embodiments, a particular SIP code 222(4) may be associated with particular IMS-based service(s). In any case, FIG. 5 shows an example algorithm that can be implemented by the destination IP address generator 218 of the UE 106 to generate a destination IP address 500 based on the service network code 222(3) and the SIP code 222(4). This destination IP address 500, once generated, can be inserted into a header of a SIP request 502 (e.g., a session request, such as a SIP INVITE) for purposes of routing the SIP request 502 to an appropriate endpoint (or endpoint device). An "endpoint device," as used herein, may include a UE (or a similar communications device), and/or an application server (AS) in the telecommunications network 102 that facilitates the utilization of particular network services, such as gaming services. In some embodiments, the destination IP address 500 is a concatenation of the service network code 222(3) and the SIP code 222(4).

Figure 6:
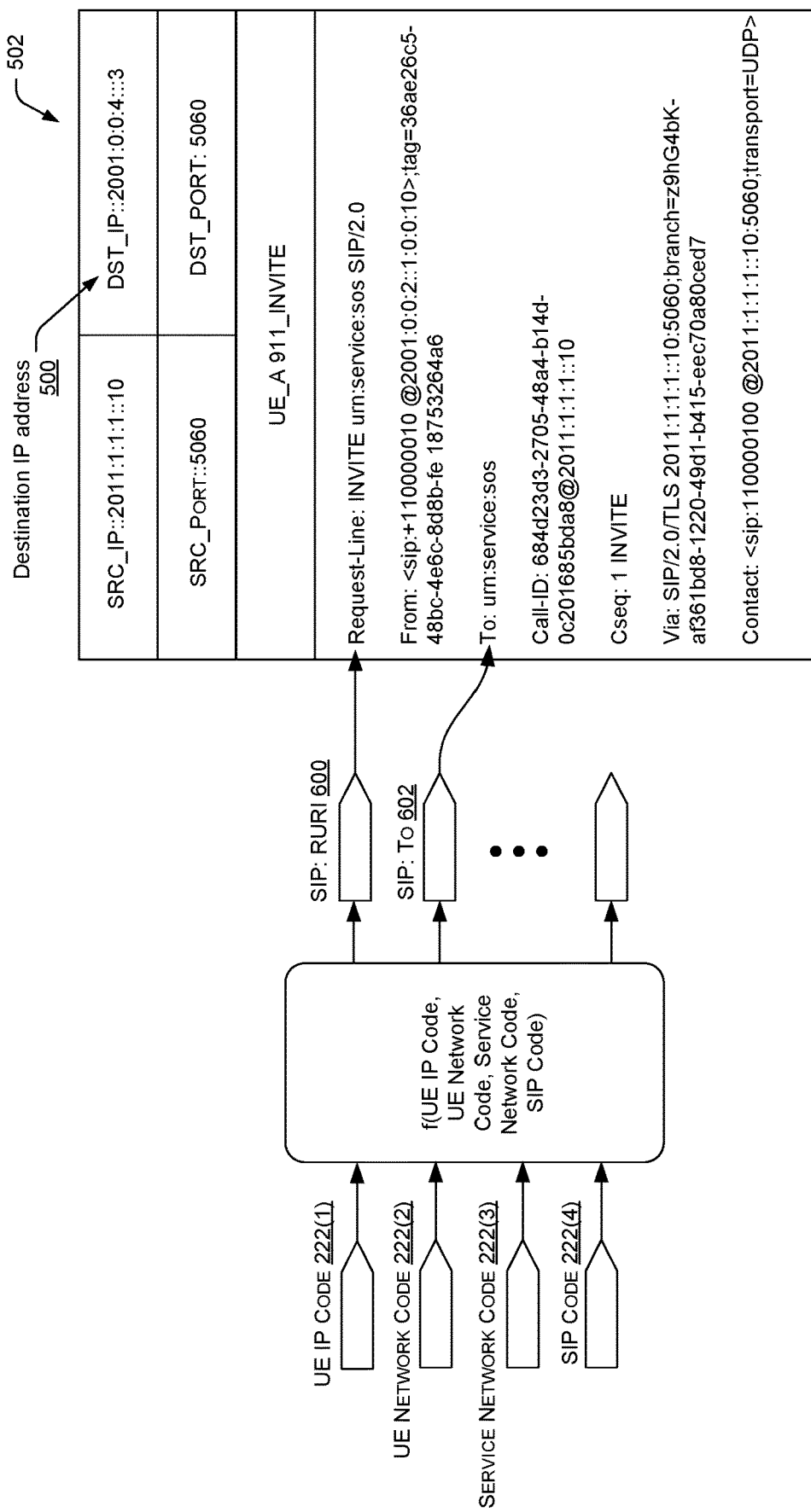
FIG. 6 shows an example UE algorithm to generate a SIP request relating to one or more network services (e.g., IMS-based services).

FIG. 6 shows an example UE algorithm that may be implemented by the IMS client 220 to generate a SIP request 502 relating to one or more network services (e.g., IMS-based services). In the example of FIG. 6, the aforementioned codes 222 (e.g., the UE IP code 222(1), the UE network code 222(2), the service network code 222(3), and/or the SIP code 222(4)) can be used to set the methods (e.g., SIP methods), headers, and parameter values in a SIP request 502 relating to particular network service(s) (e.g., IMS-based service(s)). In this example, the network service is an E-911 call service, and, hence, the codes 222 can be used to set SIP methods, and/or to set E-911-specific SIP headers and/or parameters in the SIP request 502. For instance, a SIP: Request URI (RURI) parameter 600 may be set (or generated) based on one or more of the codes 222(1)-(4). Similarly, a SIP: To parameter 602 may also be set (or generated) based on one or more of the codes 222(1)-(4). These parameters (e.g., 600 and 602) can be inserted into the SIP request 502 along with the destination IP address 500.

Figure 7:
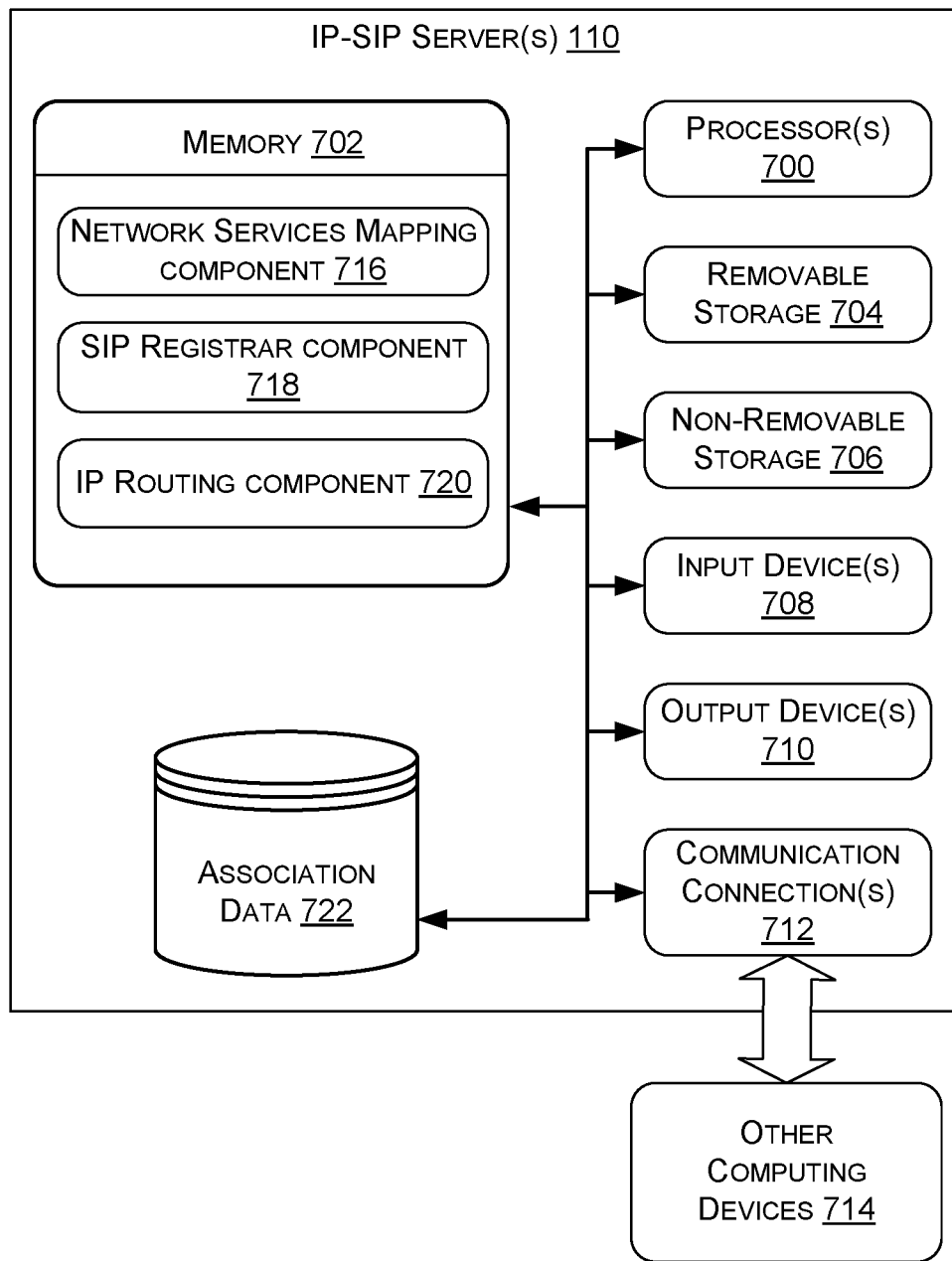
FIG. 7 is a block diagram of example IP-SIP server(s) architecture in accordance with various embodiments.

FIG. 7 is a block diagram of example IP-SIP server(s) 110 architecture in accordance with various embodiments. As shown, the IP-SIP server(s) 110 may include one or more processors 700 and one or more forms of computer-readable memory 702. The IP-SIP server(s) 110 may also include additional storage devices. Such additional storage may include removable storage 704 and/or non-removable storage 706.

The IP-SIP server(s) 110 may further include input devices 708 and output devices 710 communicatively to the processor(s) 700 and the computer-readable memory 702. The IP-SIP server(s) 110 may further include communications connection(s) 712 that allow the IP-SIP server(s) 110 to communicate with other computing devices 714, such as UEs 106 and/or additional network node(s) 112, via a network. The communications connection(s) 712 may facilitate transmitting and receiving wired and/or wireless signals over any suitable communications/data technology, standard, or protocol, as described herein. The computer-readable memory 702 may include any of the forms of memory described above with respect to the memory and computer-readable storage media of FIG. 2.

The computer-readable memory 702 of the IP-SIP server(s) 110 may include a network services mapping component 716, a SIP registrar component 718, and an IP routing component 720, among other possible modules, data structures, and/or processor-readable instructions. The IP-SIP server 110 is also shown as maintaining association data 722 that associates IP addresses to various other data, such as session-related data and services-related data.

The network services mapping component 716 of the IP-SIP server(s) 110 may be configured to generate and maintain association data 722 in the form of a network services mapping table. The aforementioned codes 222, which can be maintained by registered UEs 106, may be consistent with the data in the network services mapping table.

Figure 8:
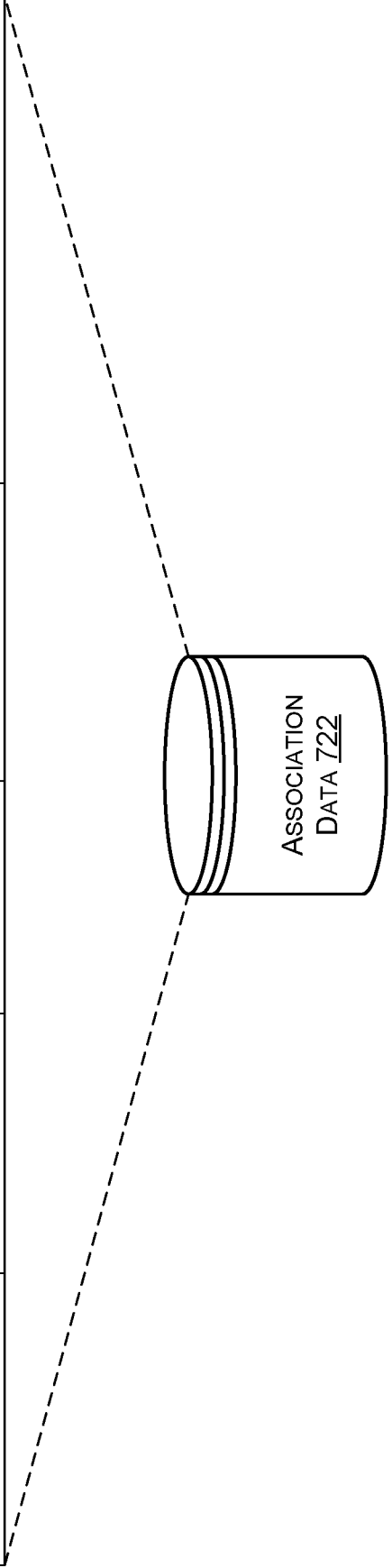
FIG. 8 illustrates an example network services mapping table that maps IP routes to network services and/or initial filter criteria (iFC).

FIG. 8 illustrates an example network services mapping table 800 that maps IP routes to network services 802 and/or initial filter criteria (iFC) 804. The network services mapping table 800 may be generated by the network services mapping component 716 of the IP-SIP server(s) 110. As shown in FIG. 8, the network services 802 may include IMS-based services, as described herein. Two example IMS-based services are shown as a "911 call" service and a "group chat" service. These network services 802 can be mapped to IP routes (e.g., IP addresses) in the network services mapping table 800. For example, the network services 802 can be mapped to a VIP address 302 and a PHY IP address 300. As mentioned above, an IPv6 address can be segmented into at least two portions: a first portion (e.g., a network portion) and a second portion (e.g., an interface ID portion). Thus, the VIP address 302 column can segment the VIP address 302 into these respective portions, wherein the first portion corresponds to a service network code 222(3), and the second portion corresponds to a SIP code 222(4). As discussed above with reference to FIG. 5, the service network code 222(3) and the SIP code 222(4) can be used, in a UE algorithm, to generate a destination IP address 500 whenever a UE 106 is requesting access to a network service 802. Thus, the first portion of the VIP address 302 (e.g., the network portion corresponding to the service network code 222(3)) can identify the service requested, while the second portion of the VIP address 302 (e.g., the interface ID portion corresponding to the SIP code 222(4)) can map to specific values within that service. The network services mapping table 800 may also map network services 802 to SIP headers and parameters 810, for setting SIP headers and parameter values in a SIP request (e.g., a session request 502, such as a SIP INVITE). The SIP headers and parameters 810 may be text-based data, which can include alphanumeric, numeric, or similar data. FIG. 8 also shows that iFC 804 may be mapped to IP routes (e.g., IP addresses). The iFC 804 may be stored in a home subscriber server (HSS) as part of a user profile and downloaded to the IP-SIP server(s) 110 upon user registration.

The aforementioned codes 222 that are maintained by a UE 106 may be consistent with the data in the network services mapping table 800. In this manner, the codes 222 received, and maintained, by the UE 106 act as a link between the core network control layer and the UE 106. In some embodiments, the codes 222 that are maintained by the UE 106 may include the network services mapping table 800

(or at least a subset of the data in the network services mapping table 800). For example, the codes 222 may identify the network service endpoints, which allow UEs 106 to construct SIP messages (e.g., SIP requests, including registration requests, session requests, etc.) to access various network services, as described herein.

Returning to FIG. 7, the SIP registrar component 718 may be configured to provide registration services for UEs 106, such as by manage registration requests 402 from UEs 106 for registering with one or more network services 802 (e.g., IMS-based services). For example, the SIP registrar component 718 may receive registration requests 402 (e.g., SIP REGISTER methods) from UEs 106, and may parse the registration requests 402 to retrieve or extract the PHY IP address 300, and/or the VIP address 302, and/or a user ID, from the registration request 402 (e.g., from the CONTACT header of the registration request 402). The SIP registrar component 718 may further maintain association data 722 in the form of a registration state table, which includes real-time state information of the UEs 106 and the IP addresses that are usable route a SIP request to the appropriate endpoint.

Figure 9:
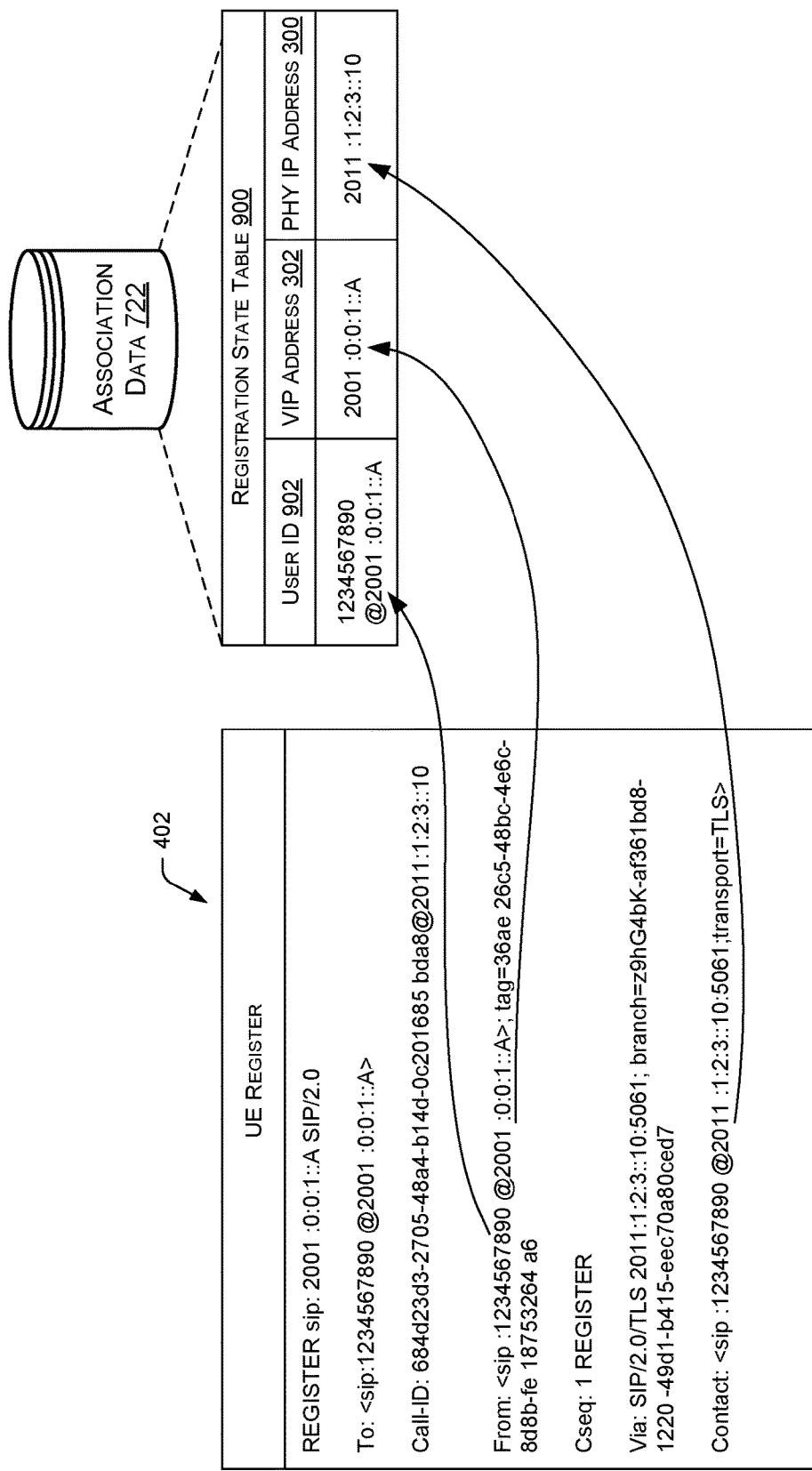
FIG. 9 is a schematic diagram showing an example technique for creating a registration entry for a UE within a registration state table based on a registration request that is received from the UE.

FIG. 9 is a schematic diagram showing an example technique for creating a registration entry for a UE 106 within a registration state table 900 based on a registration request 402 that is received from the UE 106. For example, the UE 106 may generate the registration request 402 using, for example, the technique described with reference to FIG. 4, and may send this registration request 402 to the IP-SIP server(s) 110. The SIP registrar component 718 may parse the registration requests 402 to retrieve or extract the PHY IP address 300 from the registration request 402 (e.g., from the CONTACT header of the registration request 402) and create a registration entry for the UE 106 within the registration state table 900 using the extracted PHY IP address 300. The SIP registrar component 718 may also extract the VIP address 302 from the registration request 402 and include the VIP address 302 in the registration entry for the UE 106. The registration state table 900 may also include a user ID 902 in the registration entry for the UE 106, the user ID 902 being based at least in part on the VIP address 302. Although the VIP address 302 is shown as a single column in the registration state table 900, it is to be appreciated that the registration state table 900 may segment the VIP address 302 into the first and second portions, as described herein, and, therefore, may include two columns for the VIP address 302, a first column for maintaining the first portion 308 (e.g., interface ID portion) of the VIP address 302, and a second column for maintaining the second portion 310 (e.g., network portion) of the VIP address 302. If there are multiple UEs 106 registered with the same user ID 902, multiple registration entries can be maintained with different PHY IP addresses 300 for those multiple different UEs 106. This data can be used to fork, or otherwise route, calls to multiple UEs 106 with the same VIP address 302 but different PHY IP addresses 300.

Returning to FIG. 7, the IP routing component 720 may be configured to advertise IP routes (e.g., IP addresses) as mapped to IMS network services, and to route incoming SIP requests (e.g., session requests 502) to the appropriate endpoint.

Upon associating endpoints of available network services 802 to IP routes (e.g., IP address)—such as in the network services mapping table 800 of FIG. 8—the IP routing component 720 can advertise the available network services 802 using the associated IP routes/addresses (e.g., by publishing the information to an Internet-accessible server). In this manner, any incoming traffic (e.g., SIP requests, such as session requests 502) from UEs 106 requesting access to network services 802 can be routed to the IPSIP server(s) 110. The IP routing component 720 of the IP-SIP server(s) can then retrieve or extract the destination IP address 500 from the session request 502 to make session and service decisions by, for example, identifying the network service 802 corresponding to the destination IP address 500, by replacing the destination IP address 500 in the session request 502 with a PHY IP address 300 that is associated with the destination IP address 500 in the association data 722, and by routing the session request based on that identified network service 802.

Figure 10:
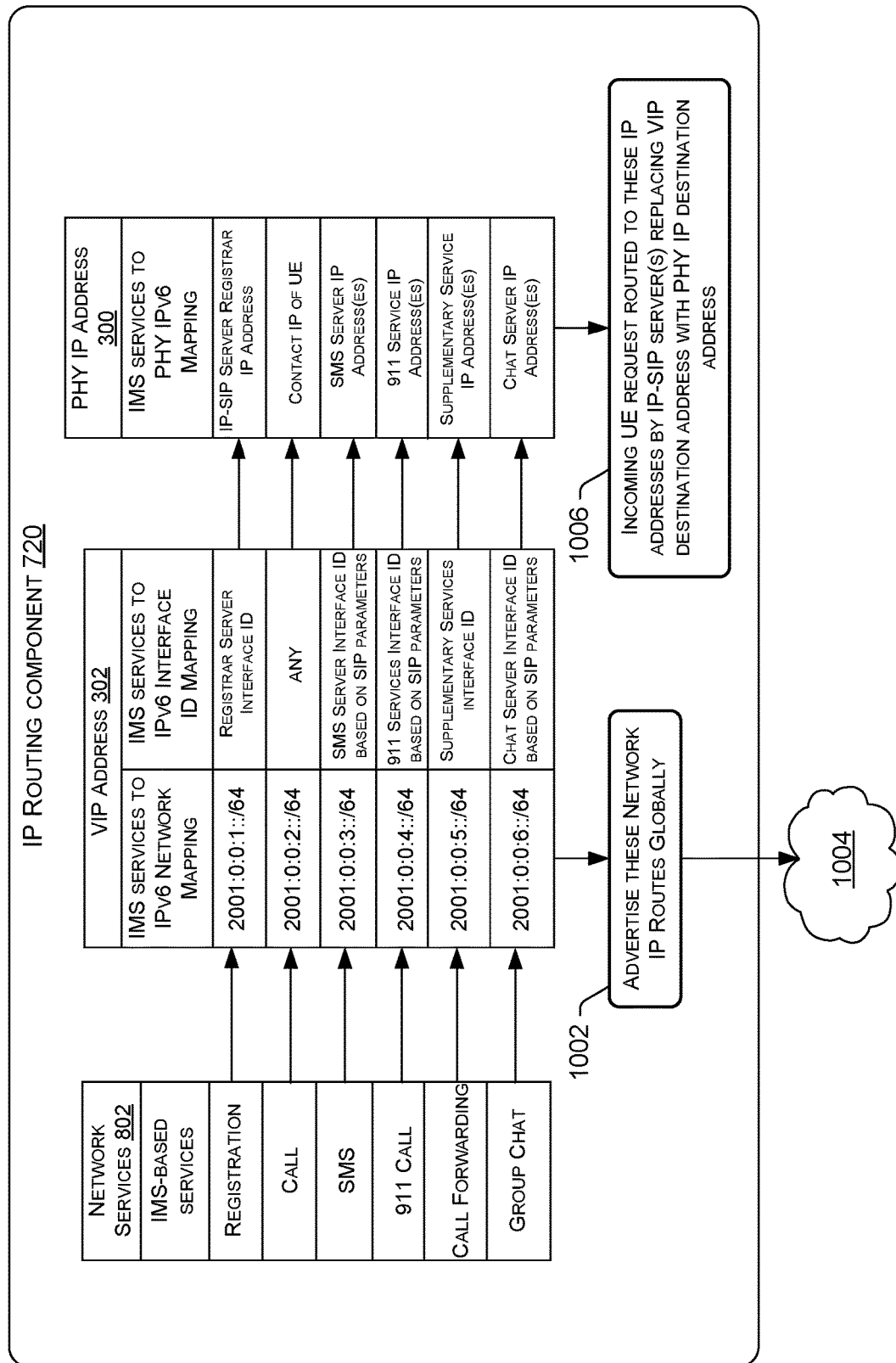
FIG. 10 illustrates a technique for advertising network services using IP routes (e.g., IP addresses).

FIG. 10 illustrates a technique for advertising network services using IP routes (e.g., IP addresses). As shown in FIG. 10, network services 802 may be mapped to IP routes (e.g., IP addresses), which may include VIP addresses 302 and PHY IP addresses 300. This association data 722 may be retrieved from the network services mapping table 800, for example. FIG. 10 shows example network services 802 as IMS-based services including, without limitation, registration services, calling services, SMS services, 911 calling services, call forwarding services, and group chat services. These network services 802 are mapped to corresponding VIP addresses 302, which, as discussed above, may be segmented into at least two portions: a first portion (e.g., a network portion), and a second portion (e.g., an interface ID portion). The IP routing component 720 may, at block 1002, advertise the first portion (e.g., the network portion) of the VIP address 302 to a network-accessible location, as shown by the network 1004 in FIG. 10, which may represent the Internet, the telecommunications network 102, or any other type of computer network that can be accessed by networked-computing devices, including the UEs 106 described herein.

As shown by block 1006, the IP routing component 720 may route incoming SIP requests (e.g., session requests 502) to the PHY IP addresses 300 that correspond to the requested network service 802. For example, the IP routing component 720 may be configured to replace the VIP destination address 500 in a session request 502 with the corresponding PHY IP address 300 that maps to the VIP destination address 500 and/or the network service 802 being requested.

Figure 11:
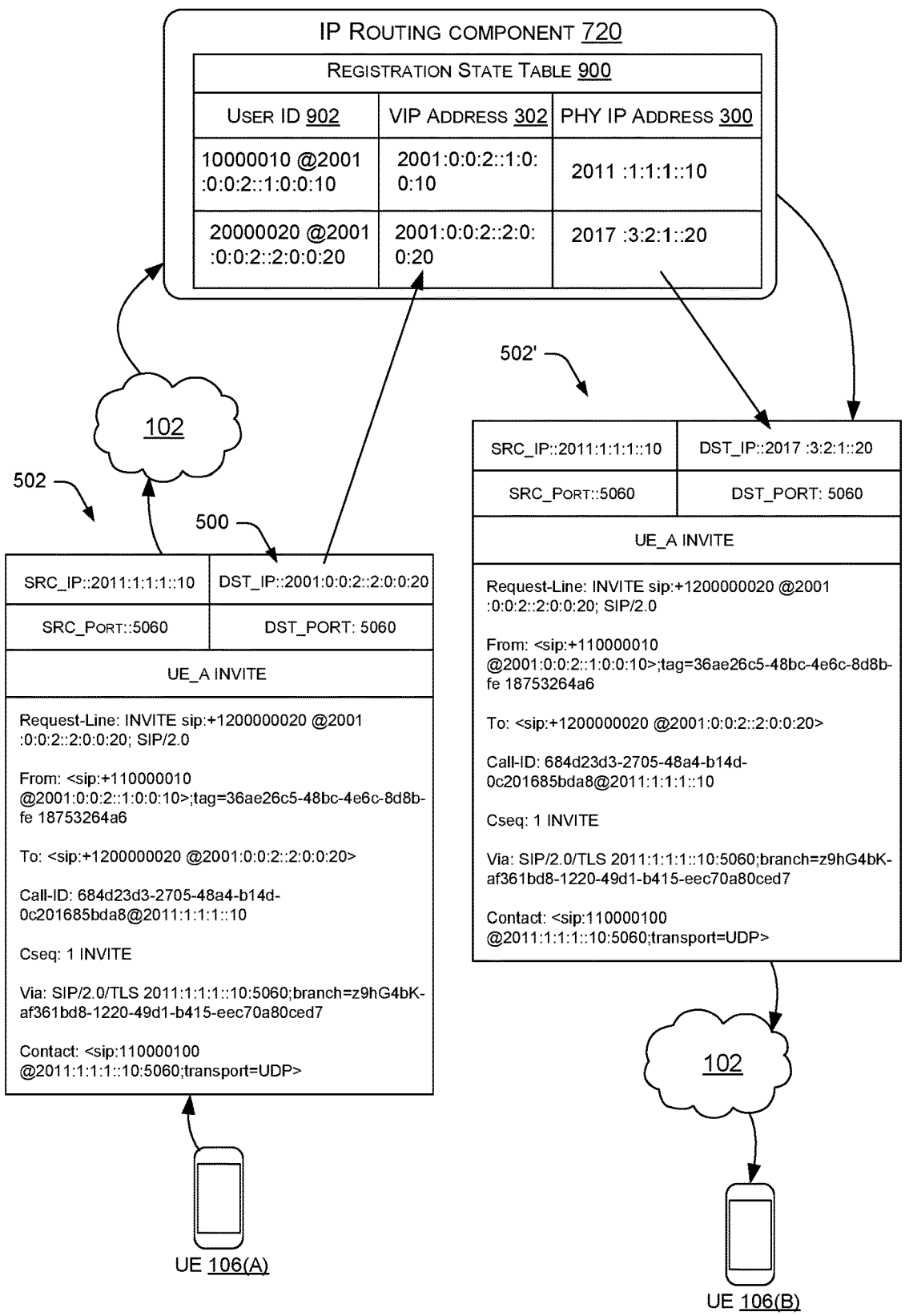
FIG. 11 illustrates an example technique for IP-based routing of incoming session requests.

FIG. 11 illustrates an example technique for IP-based routing of incoming session requests. For example, a first UE 106(A) may send a session request 502 (e.g., a SIP INVITE), which may be sent over the telecommunications network 102, to the IP-SIP server(s) 110 in order to request establishment of a communication session for particular network service(s) 802. In the example of FIG. 11, the network service(s) 802 requested by the first UE 106(A) may be a voice calling service, and, hence, the session request 502 may represent a SIP INVITE to establish a voice call (a type of communication session) with a second UE 106(B). The session requests 502 can be routed to the IPSIP server(s) 110 based on the advertisement from the IP routing component 720 of the IP-SIP server(s) 110 relating to an IP address that corresponds to the requested network service 802.

The IP-SIP server(s) 110 may receive the session request 502 and may route the incoming session request 502 to the appropriate endpoint (e.g., the second UE 106(B)) based on the destination IP address 500 in the session request 502. For instance, because the requested network service 802 in the example of FIG. 11 is a voice calling service between two UEs 106(A) and 106(B), the destination IP address 500 may correspond to a VIP address 302 for the second UE 106(B), which may have been derived (e.g., algorithmically) by the first UE 106(A) based at least in part on a MSISDN of the second UE 106(B) and/or based on one or more codes 222, as described herein. In any case, upon receipt of the session request 502, the IP routing component 720 can consult the registration state table 900 to identify the PHY IP address 300 of the appropriate UE endpoint; in this case the PHY IP address 300 associated with the second UE 106(B). For example, the IP-SIP server(s) 110 may receive the session request 502, and the IP routing component 720 may extract the destination IP address 500 from the session request 502, identify the network service 802 as a voice calling service, and attempt to identify a VIP address 302 in the registration state table 900 that matches the destination IP address 500 in the session request 502. If a matching VIP address 302 is identified in the registration state table 900, the IP routing component 720 can route the session request 502 to the appropriate endpoint by retrieving the PHY IP address 300 that is associated with the identified VIP address 302, replacing (or substituting) the destination IP address 500 in the session request 502 with the retrieved PHY IP address 300 to generate a modified session request 502', and routing the modified session request 502' to the endpoint associated with the PHY IP address 300. For example, the modified session request 502' can be sent over the telecommunications network 102 to the appropriate endpoint; in this case, the second UE 106(B) associated with the retrieved PHY IP address 300. Thus, FIG. 11 illustrates a streamlined session control approach for routing an incoming session request 502. Such an approach may conserve network resources as compared existing session control implementations. It is to be appreciated that, for particular network services 802, the IP routing component 720 may consult other association data 722 to identify a matching VIP address 302 that matches the destination IP address 500 in the session request 502. For example, the network services mapping table 800 can be consulted to identify a matching VIP address 302 and to retrieve the corresponding PHY IP address 300 of the appropriate endpoint.

Figure 12:
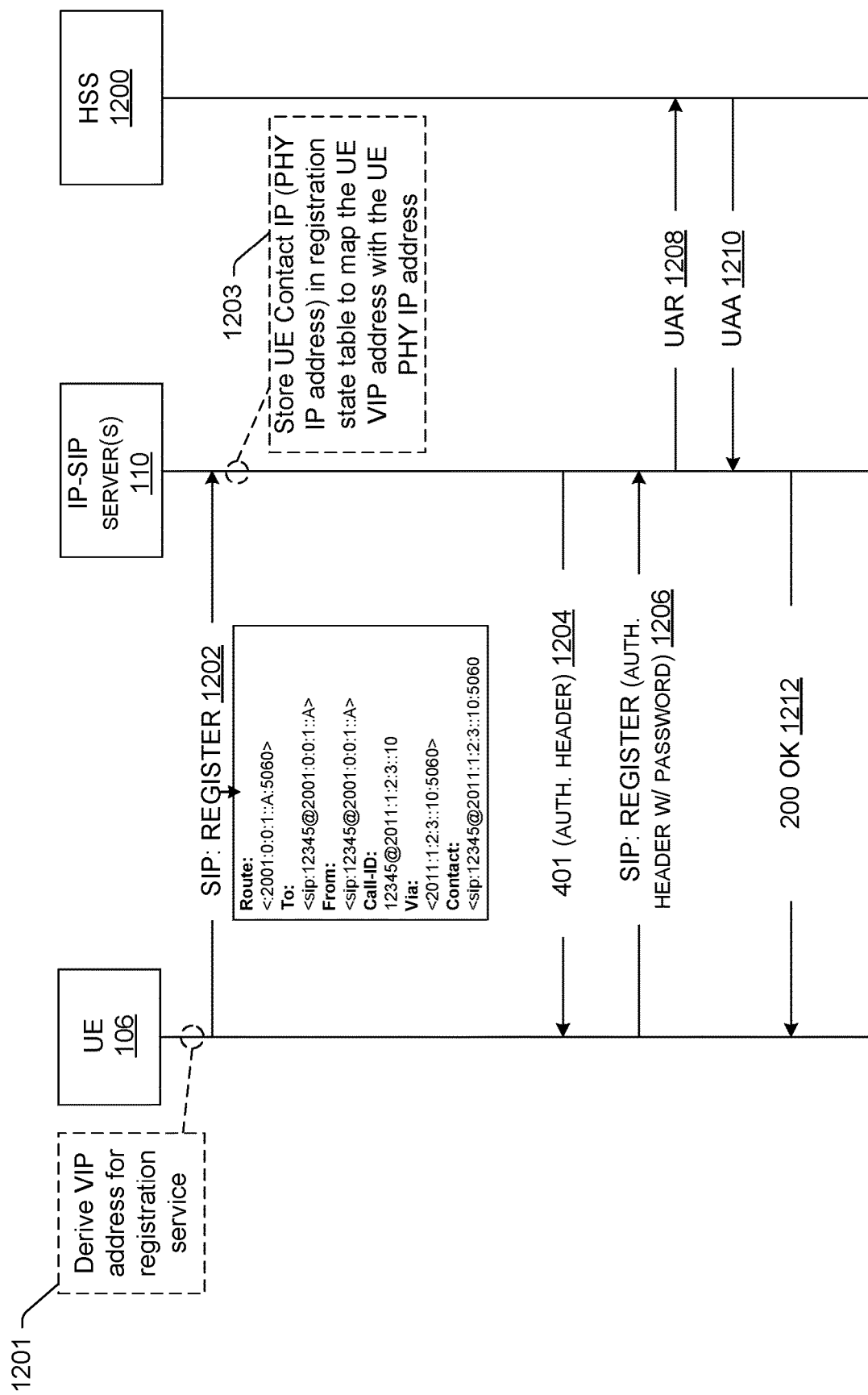
FIG. 12 is a diagram illustrating example signaling between a UE, IP-SIP server(s), and a HSS while the UE is registering for access to network service(s).

FIG. 12 is a diagram illustrating example signaling between a UE 106, IP-SIP server(s) 110, and a HSS 1200 while the UE 106 is registering for access to network service(s). Initially, the UE 106 may derive (or otherwise determine) a VIP address 302 associated with a registration service (a network service 802). The UE 106, at 1201, can derive the VIP address 302 algorithmically, as described herein, using one or more of the codes 222 that the UE 222 may have received (e.g., via an application update) at an earlier point in time. The UE 106 can then generate and send a SIP request 1202 to register for access to one or more network services 802 (e.g., IMS-based services). The SIP request 1202 may correspond to the registration request 402, described above with reference to FIG. 4. Accordingly, the SIP request 1202 (e.g., a registration request 402) may be generated by inserting the VIP address 302 associated with the UE 106 and the PHY IP address 300 associated with the UE 106 in the SIP request 1202. Again, the VIP address 302 associated with the UE 106 may be algorithmically determined, such as using the technique described in FIG. 3, wherein the VIP address 302 for the UE 106 is derived from the MSISDN of the UE 106, and one or more codes 222 (e.g., the UE IP code 222(1) and the UE network code 222(2)).

The IP-SIP server(s) 110 may receive the SIP request 1202 and, at 1203, the SIP registrar component 718 of the IP-SIP server(s) 110 may extract at least the PHY IP address 300 from the SIP request 1202 (e.g., from the CONTACT header of a registration request 402), and may create a registration entry in a registration state table 900 using the PHY IP address 300 of the UE 106. The SIP registrar component 718 may also extract the VIP address 302 associated with the UE 106 from the SIP request 1202, and may map the PHY IP address 300 of the UE 106 to the VIP address 302 of the UE 106 within the registration entry. In some embodiments, the SIP registrar component 718 may include a user ID 902 in the registration entry that is mapped to the PHY IP address 300.

The SIP registrar component 718 of the IP-SIP server(s) 110 may send a 401 SIP response 1204 that includes an authentication header. The UE 106 may receive the 401 SIP response 1204, and may send a second SIP request 1206 using the SIP REGISTER method, wherein the second SIP request 1206 includes the authentication header with a password.

The SIP registrar component 718 of the IP-SIP server(s) 110 may send a user authorization request (UAR) 1208 to the HSS 1200, and the HSS 1200 may send a user authorization answer (UAA) 1210 to the IP-SIP server(s) 110. The SIP registrar component 718 of the IP-SIP server(s) 110 may send a 200 OK response 1212 to the UE 106 to indicate a successful registration.

Figure 13:
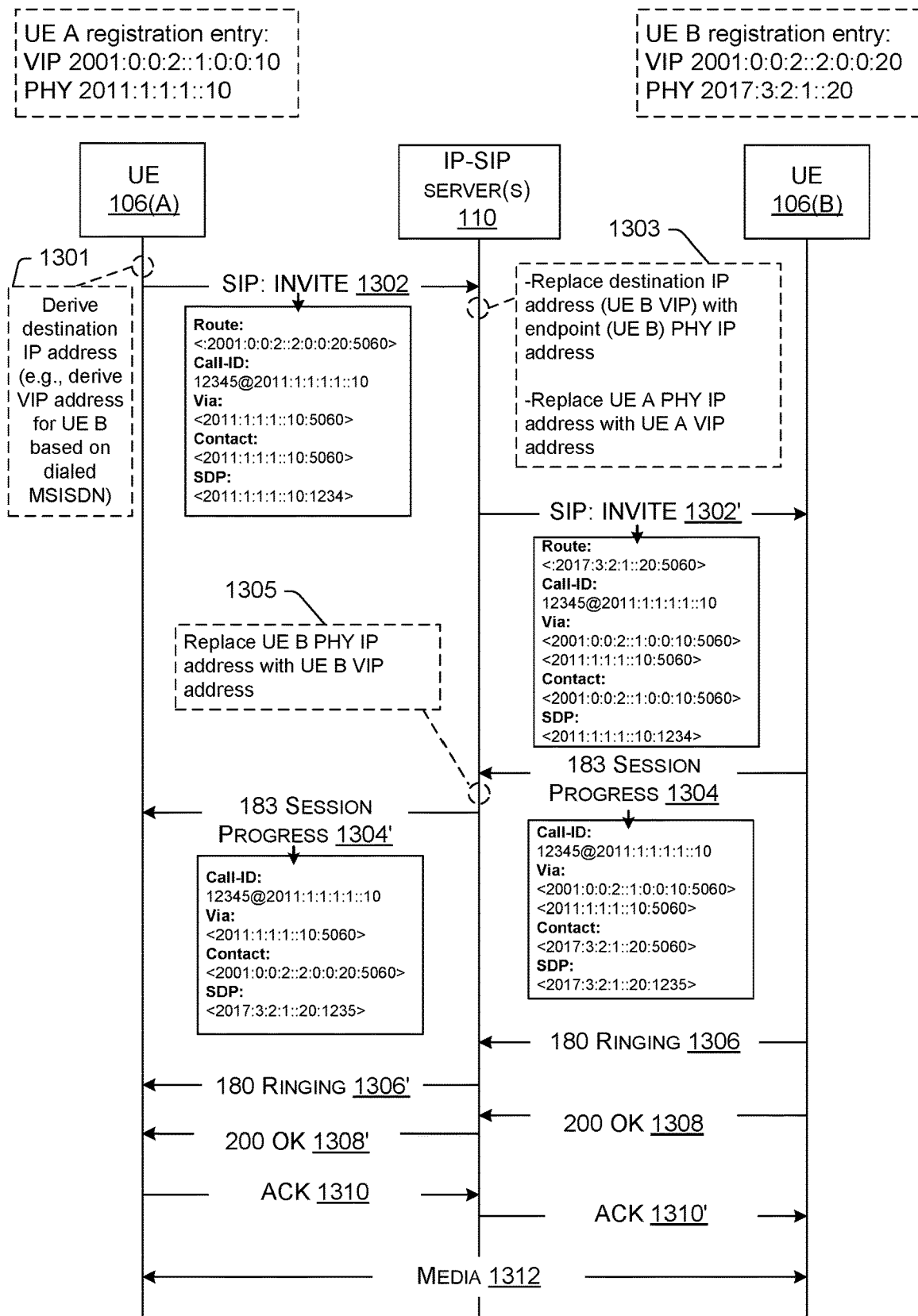
FIG. 13 is a diagram illustrating example signaling between a first UE, IP-SIP server(s), and a second UE while the first UE is requesting establishment of a communication session with the second UE (e.g., to establish a voice call).

FIG. 13 is a diagram illustrating example signaling between a first UE 106(A) (sometimes referred to as "UE A"), IP-SIP server(s) 110, and a second UE 106(B) (sometimes referred to as "UE B") while the first UE 106(A) is requesting establishment of a communication session with the second UE 106(B) (e.g., to establish a voice call). Initially, the first UE 106(A)—acting as a mobile originating (MO) UE—may, at 1301, derive (or otherwise determine) a destination IP address 500, which, in the case of a communication session between the first UE 106(A) and the second UE 106(B), may comprise a VIP address 302 for a second UE 106(B). This VIP address 302 for the second UE 106(B) can be derived from a MSISDN of the second UE 106(B). For example, a first user 104(A) may dial a phone number of a second user 104(B) using the first UE 106(A), and the first UE 106(A) may implement an algorithm, such as the algorithm described with reference to FIG. 3, to derive a VIP address 302 for the second UE 106(B) based on the MSISDN 306 of the second UE 106(B). The algorithm may also utilize one or more codes 222 to derive the destination IP address 500 (e.g., the VIP address 302 for the second UE 106(B)), such as a UE IP code 222(1) that is available in local memory of the first UE 106(A).

The first UE 106(A) may generate and send a SIP request 1302 (e.g., a session request 502) to request establishment of a communication session with the second UE 106(B). The SIP request 1302 may be sent over the telecommunications network 102 to the IP-SIP server(s) 110. The SIP request 1302 (e.g., a session request 502, such as a SIP INVITE) may include the destination IP address 500 (e.g., the VIP address 302 of the second UE 106(B)) that was algorithmically generated by the first UE 106(A) at 1301. This destination IP address 500 is shown in the ROUTE header of the SIP request 1302 in FIG. 13.

The IP-SIP server(s) 110 may receive the SIP request 1302, and the IP routing component 720 of the IP-SIP server(s) 110 may extract the destination IP address 500 (e.g., the VIP address 302 for the second UE 106(B)) from the SIP request 1302, identify the network service 802 as a voice calling service, and attempt to identify a VIP address 302 in the registration state table 900 that matches the destination IP address 500 in the SIP request 1302. At 1303, if a matching VIP address 302 is identified in the registration state table 900, the IP routing component 720 of the IP-SIP server(s) 110 can route the SIP request 1302 to the appropriate endpoint by retrieving the PHY IP address 300 that is associated with the identified VIP address 302, replacing (or substituting) the destination IP address 500 in the SIP request 1302 with the retrieved PHY IP address 300 to generate a modified SIP request 1302', and routing the modified SIP request 1302' to the endpoint associated with the PHY IP address 300; in this case the second UE 106(B). For example, the modified SIP request 1302' can be sent over the telecommunications network 102 to second UE 106(B) associated with the retrieved PHY IP address 300. Also, at 1303, the IP routing component 720 of the IP-SIP server(s) 110 may replace the PHY IP address 300 for the first UE 106(A) in the SIP request 1302 with the VIP address 302 for the first UE 106(A). This is shown in the CONTACT header of the SIP request 1302 in FIG. 13, and may be performed in order to route any subsequent SIP requests to the IP-SIP server(s) 110 (instead of directly to the first UE 106(A)). In some embodiments, the IP routing component 720 of the IP-SIP server(s) 110 may, at 1303, insert the VIP address 302 for the first UE into the VIA header of the SIP request 1302 before routing the modified SIP request 1302' to the second UE 106(B).

The second UE 106(B) may receive the modified SIP request 1302', and may respond with a 183 Session Progress message 1304. The IP-SIP server(s) 110 may receive the 183 Session Progress message 1304 from the second UE 106(B) and the IP routing component 720 of the IP-SIP server(s) 110 may, at 1305, replace the PHY IP address 300 for the second UE 106(B) with the VIP address 302 for the second UE 106(B) to generate a modified 183 Session Progress message 1304'. This is shown in the CONTACT header of the 183 Session progress message 1304, and may be performed in order to route any subsequent SIP requests to the IP-SIP server(s) 110 (instead of directly to the second UE 106(B)). In some embodiments, the IP routing component 720 of the IP-SIP server(s) 110 may, at 1305, remove the VIP address 302 for the first UE 106(A) from the modified 183 Session Progress message 1304'. The IP-SIP server(s) 110 may send, and the first UE 106(A) may receive, the modified 183 Session Progress message 1304' to indicate to the first UE 106(A) that the communication session is being setup.

The second UE 106(B) may send a 180 Ringing message 1306 to the IP-SIP server(s) 110 when the second UE 106(B) starts to alert the second user 104(B). The IP-SIP server(s) 110 may receive the 180 Ringing message 1306 from the second UE 106(B) and the IP routing component 720 of the IP-SIP server(s) 110 may, again, replace the PHY IP address 300 for the second UE 106(B) with the VIP address 302 for the second UE 106(B) to generate a modified 180 Ringing message 1306'. This replacement can be done in the CONTACT header of the 180 Ringing message 1306, and may be performed in order to route any subsequent SIP requests to the IP-SIP server(s) 110 (instead of directly to the second UE 106(B)). In some embodiments, the IP routing component 720 of the IP-SIP server(s) 110 may remove the VIP address 302 for the first UE 106(A) from the modified 180 Ringing message 1306'. The IP-SIP server(s) 110 may send, and the first UE 106(A) may receive, the modified 180 Ringing message 1306' to indicate to the first UE 106(A) that the second user 104(B) is being alerted.

The second UE 106(B) may send a 200 OK message 1308 to the IP-SIP server(s) 110 when the second user 104(B) accepts the request (e.g., answers the phone). The IP-SIP server(s) 110 may receive the 200 OK message 1308 from the second UE 106(B) and the IP routing component 720 of the IP-SIP server(s) 110 may, again, replace the PHY IP address 300 for the second UE 106(B) with the VIP address 302 for the second UE 106(B) to generate a modified 200 OK message 1308'. This replacement can be done in the CONTACT header of the 200 OK message 1308, and may be performed in order to route any subsequent SIP requests to the IP-SIP server(s) 110 (instead of directly to the second UE 106(B)). In some embodiments, the IP routing component 720 of the IP-SIP server(s) 110 may remove the VIP address 302 for the first UE 106(A) from the modified 200 OK message 1308'. The IP-SIP server(s) 110 may send, and the first UE 106(A) may receive, the modified 200 OK message 1308' to indicate to the first UE 106(A) that the communication session has been successfully established.

The first UE 106(A) may send an ACK message 1310 to the IP-SIP server(s) 110, and the IP routing component 720 of the IP-SIP server(s) 110 route a modified ACK message 1310' to the second UE 106(A). The modified ACK message 1310' may include the VIP address 302 for the first UE 102(A) in the VIA header of the modified ACK message 1310'. The first and second UEs 106(A) and 106(B) can communicate media 1312 directly between each other, via the telecommunications network 102, without having to route the media 1312 through the IP-SIP server(s) 110 during the communication session.

Figure 14:
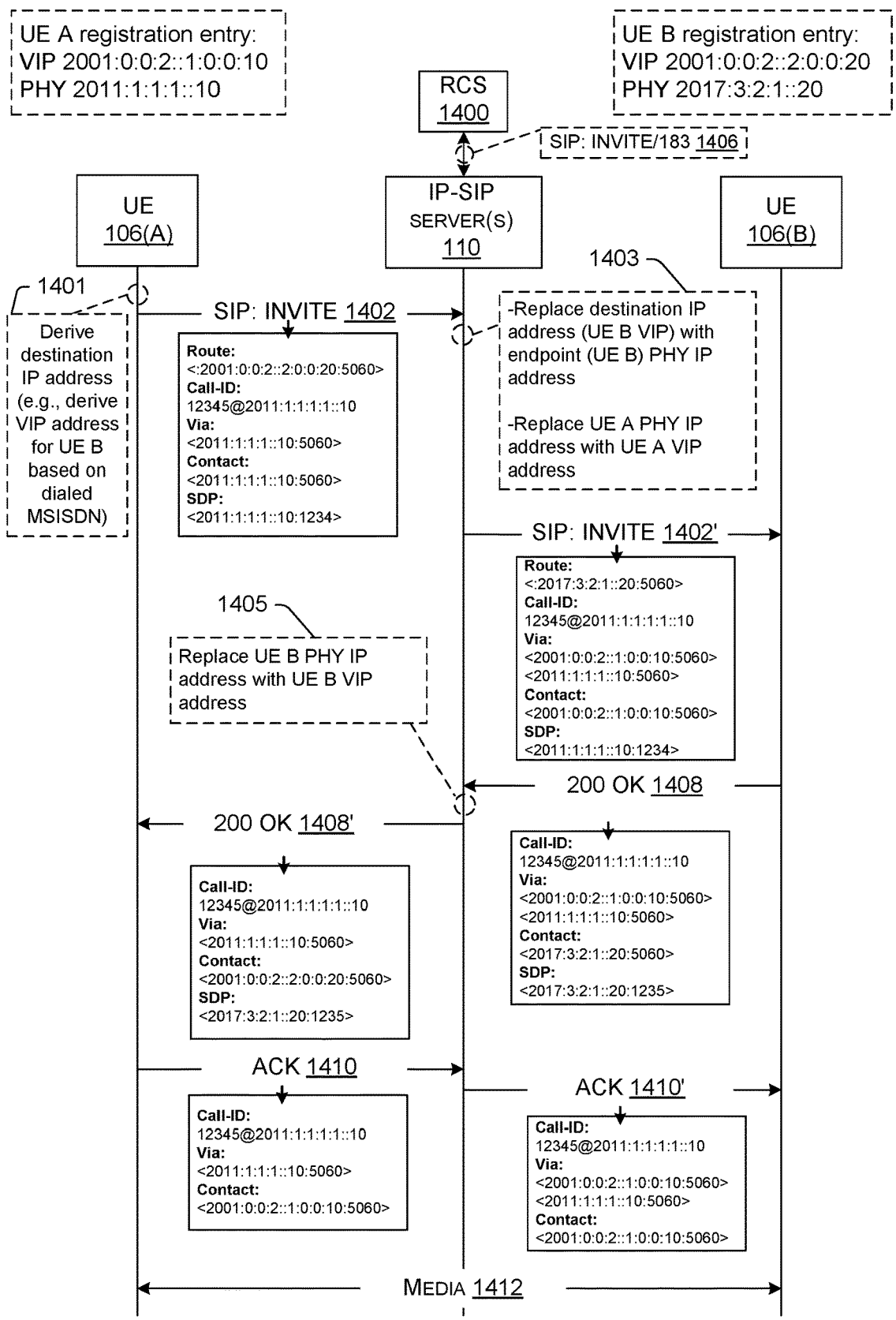
FIG. 14 is a diagram illustrating example signaling between a first UE, IP-SIP server(s), and a second UE while the first UE is requesting establishment of a communication session with the second UE (e.g., to establish a SMS, chat, and/or file transfer services).

FIG. 14 is a diagram illustrating example signaling between a first UE, IP-SIP server(s), and a second UE while the first UE is requesting establishment of a communication session with the second UE (e.g., to establish a SMS, chat, and/or file transfer services). Initially, the first UE 106(A)—acting as a mobile originating (MO) UE—may, at 1401, derive (or otherwise determine) a destination IP address 500, which, in the case of a communication session between the first UE 106(A) and the second UE 106(B), may comprise a VIP address 302 for a second UE 106(B). This VIP address 302 for the second UE 106(B) can be derived from a MSISDN of the second UE 106(B). For example, a first user 104(A) may invoke a text, chat, and/or file transfer application to send media to a phone number of a second user 104(B) using the first UE 106(A), and the first UE 106(A) may implement an algorithm, such as the algorithm described with reference to FIG. 3, to derive a VIP address 302 for the second UE 106(B) based on the MSISDN 306 of the second UE 106(B). The algorithm may also utilize one or more codes 222 to derive the destination IP address 500 (e.g., the VIP address 302 for the second UE 106(B)), such as a UE IP code 222(1) that is available in local memory of the first UE 106(A).

The first UE 106(A) may generate and send a SIP request 1402 (e.g., a session request 502) to request establishment of a communication session with the second UE 106(B). The SIP request 1402 may be sent over the telecommunications network 102 to the IP-SIP server(s) 110. The SIP request 1402 (e.g., a session request 502, such as a SIP INVITE) may include the destination IP address 500 (e.g., the VIP address 302 of the second UE 106(B)) that was algorithmically generated by the first UE 106(A) at 1401. This destination IP address 500 is shown in the ROUTE header of the SIP request 1402 in FIG. 14.

The IP-SIP server(s) 110 may receive the SIP request 1402, and the IP routing component 720 of the IP-SIP server(s) 110 may extract the destination IP address 500 (e.g., the VIP address 302 for the second UE 106(B)) from the SIP request 1402, identify the network service 802 as a SMS, chat, and/or file transfer service, and attempt to identify a VIP address 302 in the registration state table 900 that matches the destination IP address 500 in the SIP request 1402. At 1403, if a matching VIP address 302 is identified in the registration state table 900, the IP routing component 720 of the IP-SIP server(s) 110 can route the SIP request 1402 to the appropriate endpoint by retrieving the PHY IP address 300 that is associated with the identified VIP address 302, replacing (or substituting) the destination IP address 500 in the SIP request 1402 with the retrieved PHY IP address 300 to generate a modified SIP request 1402', and routing the modified SIP request 1402' to the endpoint associated with the PHY IP address 300; in this case the second UE 106(B). For example, the modified SIP request 1402' can be sent over the telecommunications network 102 to second UE 106(B) associated with the retrieved PHY IP address 300. Also, at 1403, the IP routing component 720 of the IP-SIP server(s) 110 may replace the PHY IP address 300 for the first UE 106(A) in the SIP request 1402 with the VIP address 302 for the first UE 106(A). This is shown in the CONTACT header of the SIP request 1402 in FIG. 14, and may be performed in order to route any subsequent SIP requests to the IP-SIP server(s) 110 (instead of directly to the first UE 106(A)). In some embodiments, the IP routing component 720 of the IP-SIP server(s) 110 may, at 1403, insert the VIP address 302 for the first UE 102(A) into the VIA header of the SIP request 1402 before routing the modified SIP request 1402' to the second UE 106(B).

In order to implement SMS, chat, and/or file transfer services, the IP-SIP server(s) 110 may also exchange SIP messages 1406 with a Rich Communication Services (RCS) node 1400. For example SIP INVITE message(s), a 183 Session Progress message, and/or other types of SIP messages 1406 may be exchanged between the IP-SIP server(s) 110 and the RMS node 1400. The RMS node 1400 may represent additional network node(s) 112, introduced in FIG. 1.

The second UE 106(B) may receive the modified SIP request 1402', and may respond with a 200 OK message 1408 to the IP-SIP server(s) 110. The IP-SIP server(s) 110 may receive the 200 OK message 1408 from the second UE 106(B) and the IP routing component 720 of the IP-SIP server(s) 110 may, at 1405, replace the PHY IP address 300 for the second UE 106(B) with the VIP address 302 for the second UE 106(B) to generate a modified 200 OK message 1408'. This replacement can be done in the CONTACT header of the 200 OK message 1408, and may be performed in order to route any subsequent SIP requests to the IP-SIP server(s) 110 (instead of directly to the second UE 106(B)). In some embodiments, the IP routing component 720 of the IP-SIP server(s) 110 may remove the VIP address 302 for the first UE 106(A) from the modified 200 OK message 1408'. The IP-SIP server(s) 110 may send, and the first UE 106(A) may receive, the modified 200 OK message 1408' to indicate to the first UE 106(A) that the communication session has been successfully established.

The first UE 106(A) may send an ACK message 1410 to the IP-SIP server(s) 110, and the IP routing component 720 of the IP-SIP server(s) 110 route a modified ACK message 1410' to the second UE 106(A). The modified ACK message 1410' may include the VIP address 302 for the first UE 102(A) in the VIA header of the modified ACK message 1410'. The first and second UEs 106(A) and 106(B) can communicate media 1412 directly between each other, via the telecommunications network 102, without having to route the media 1412 through the IP-SIP server(s) 110 during the communication session. In the case of a SMS, chat, and/or file transfer service, the media 1412 may include text, image files, video files, multimedia files, or the like.

Figure 15:
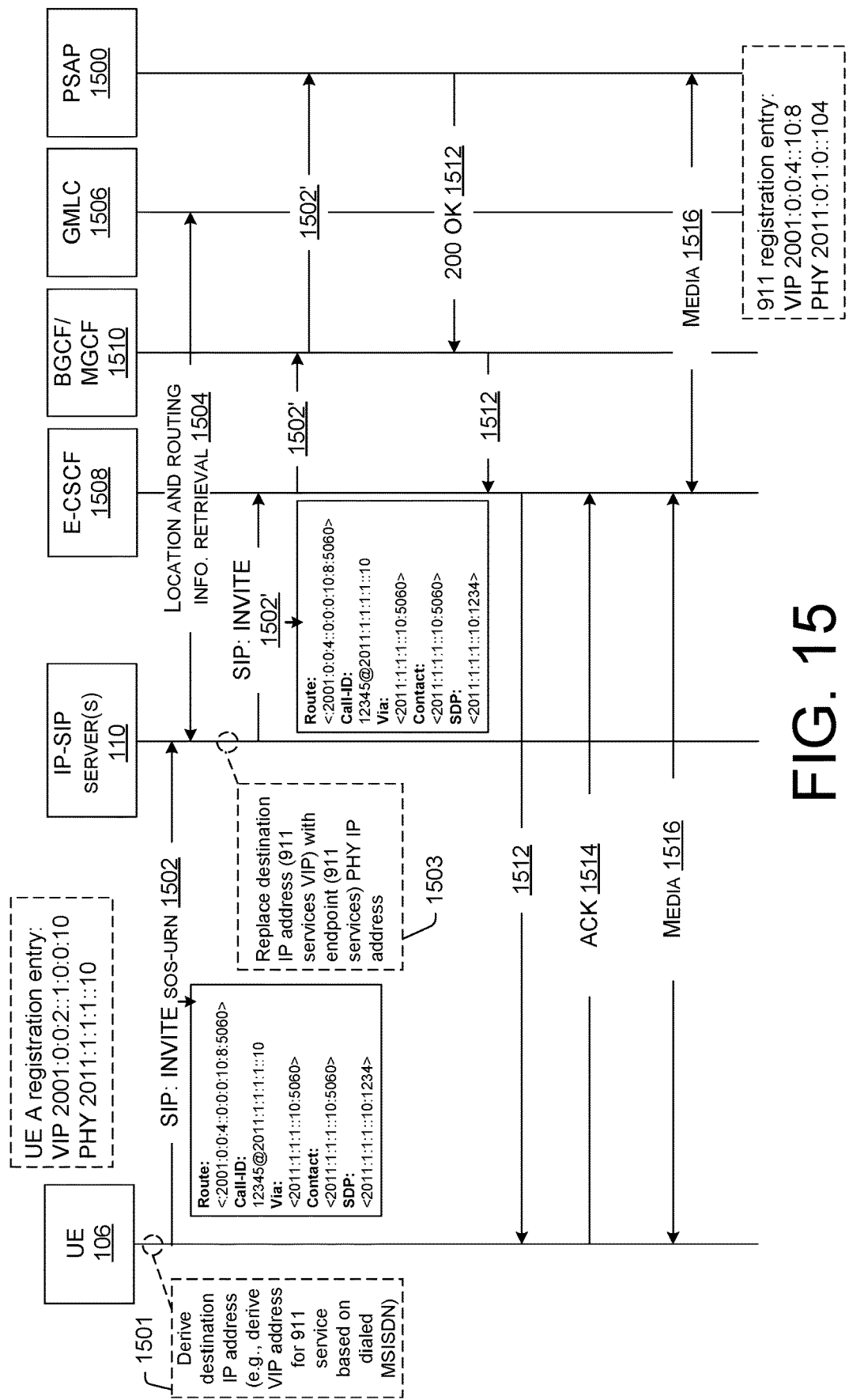
FIG. 15 is a diagram illustrating example signaling between a UE, IP-SIP server(s), and a public safety answering point (PSAP) while the UE is requesting establishment of a communication session with the PSAP (e.g., to establish a 911 call).

FIG. 15 is a diagram illustrating example signaling between a UE 106, IP-SIP server(s) 110, and a public safety answering point (PSAP) 1500 while the UE 106 is requesting establishment of a communication session with the PSAP 1500 (e.g., to establish a 911 call). Initially, the UE 106—acting as a mobile originating (MO) UE—may, at 1501, derive (or otherwise determine) a destination IP address 500, which, in the case of a 911 calling service (or a service that uses another emergency short code), may comprise a VIP address 302 for the 911 service (a network service 802). This VIP address 302 for the 911 service can be derived from a MSISDN dialed by the user 104, such as an emergency short code (e.g., 911 in the United States). For example, a user 104 may dial an emergency short code using the UE 106, and the UE 106 may implement an algorithm, such as the algorithm described with reference to FIG. 5, to derive a VIP address 302 for 911 service. The algorithm may utilize one or more codes 222 to derive the destination IP address 500 (e.g., the VIP address 302 for 911 service), such as a service network code 222(3), a SIP code 222(4), etc., and these codes may be available in local memory of the UE 106.

The UE 106 may generate and send a SIP request 1502 (e.g., a session request 502) to request establishment of a communication session with a nearest PSAP 1500. The SIP request 1502 may be sent over the telecommunications network 102 to the IP-SIP server(s) 110. The SIP request 1502 (e.g., a session request 502, such as a SIP INVITE) may include the destination IP address 500 (e.g., the VIP address 302 of the 911 service) that was algorithmically generated by the UE 106 at 1501. This destination IP address 500 is shown in the ROUTE header of the SIP request 1502 in FIG. 15. The SIP request 1502 may also include E-911-specific SIP headers and/or parameters. For instance, an E-911-specific SIP header (e.g., sos-urn) may be set (or generated) based on one or more of the codes 222(1)-(4) specific to the 911 service. Such headers and/or parameters can be inserted into the SIP request 1502 along with the destination IP address 500.

The IP-SIP server(s) 110 may receive the SIP request 1502, and the IP routing component 720 of the IP-SIP server(s) 110 may extract the destination IP address 500 (e.g., the VIP address 302 for 911 service) from the SIP request 1502, identify the network service 802 as a 911 service based on the destination IP address 500, retrieve location and routing information from a gateway mobile location center (GMLC) node 1506 (e.g., to determine the location of the UE 106, and hence the user 104, as well as a nearest PSAP 1500). The IP routing component 720 of the IP-SIP server(s) 110 may identify a registration entry of the nearest PSAP 1500 (e.g., a PSAP within a threshold distance of the user's estimated location, or a PSAP, among multiple PSAPs that is a shortest distance from the user's estimated location) in the registration state table 900. At 1503, upon identifying a registration entry of the nearest PSAP 1500 in the registration state table 900, the IP routing component 720 of the IP-SIP server(s) 110 can route the SIP request 1502 to the appropriate endpoint by retrieving the PHY IP address 300 from the registration entry of the nearest PSAP 1500, replacing (or substituting) the destination IP address 500 in the SIP request 1502 with the retrieved PHY IP address 300 to generate a modified SIP request 1502', and routing the modified SIP request 1502' to an E-CSCF node 1508. The E-CSCF node 1508 may forward the modified SIP request 1502' to a BGCF/MGCF node 1510, which may forward the modified SIP request 1502' to the endpoint associated with the PHY IP address 300; in this case the PSAP 1500. For example, the modified SIP request 1502' can be sent over the telecommunications network 102 to PSAP 1500 associated with the retrieved PHY IP address 300.

The PSAP 1500 may receive the modified SIP request 1502', and may respond with a 200 OK message 1512 to the BGCF/MGCF node 1510, which may forward the 200 OK message 1512 to the E-CSCF node 1508, which may forward the 200 OK message 1512 to the UE 106. The UE 106 may receive the 200 OK message 1512 to indicate to the UE 106 that the communication session has been successfully established.

The UE 106 may send an ACK message 1514 to the E-CSCF node 1508, and the UE 106 can exchange/communicate media 1516 with/to the PSAP 1500, via the telecommunications network 102, and via the E-CSCF node 1508. In the case of a 911 call, the media 1516 can be voice media.

Figure 16A:
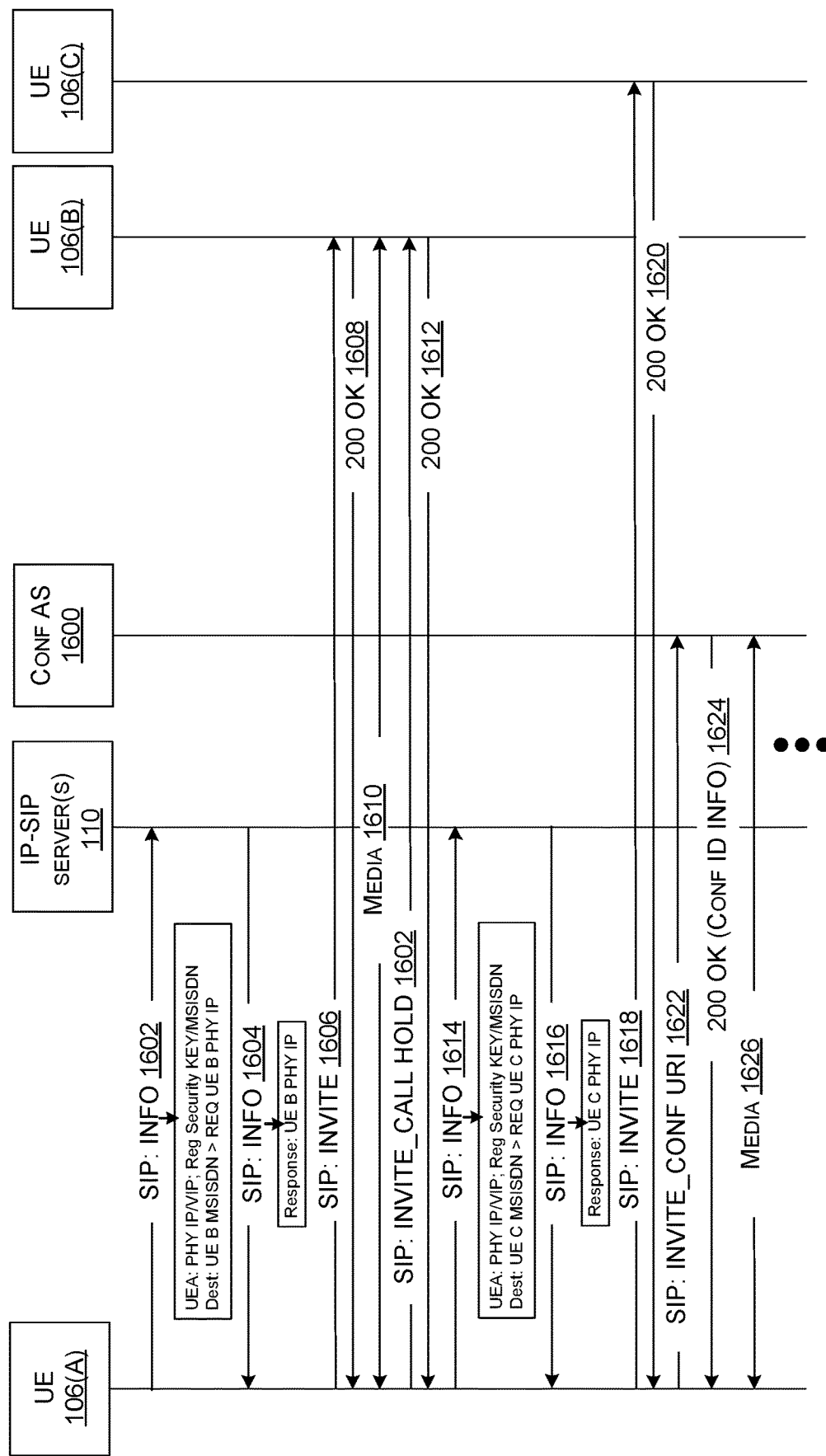
FIGS. 16A and 16B are, collectively, a diagram illustrating example signaling between multiple UEs, IP-SIP server(s), and a conference application server (AS) while a first UE is requesting establishment of a communication session with two other UEs (e.g., to establish a conference call).
Figure 16B:
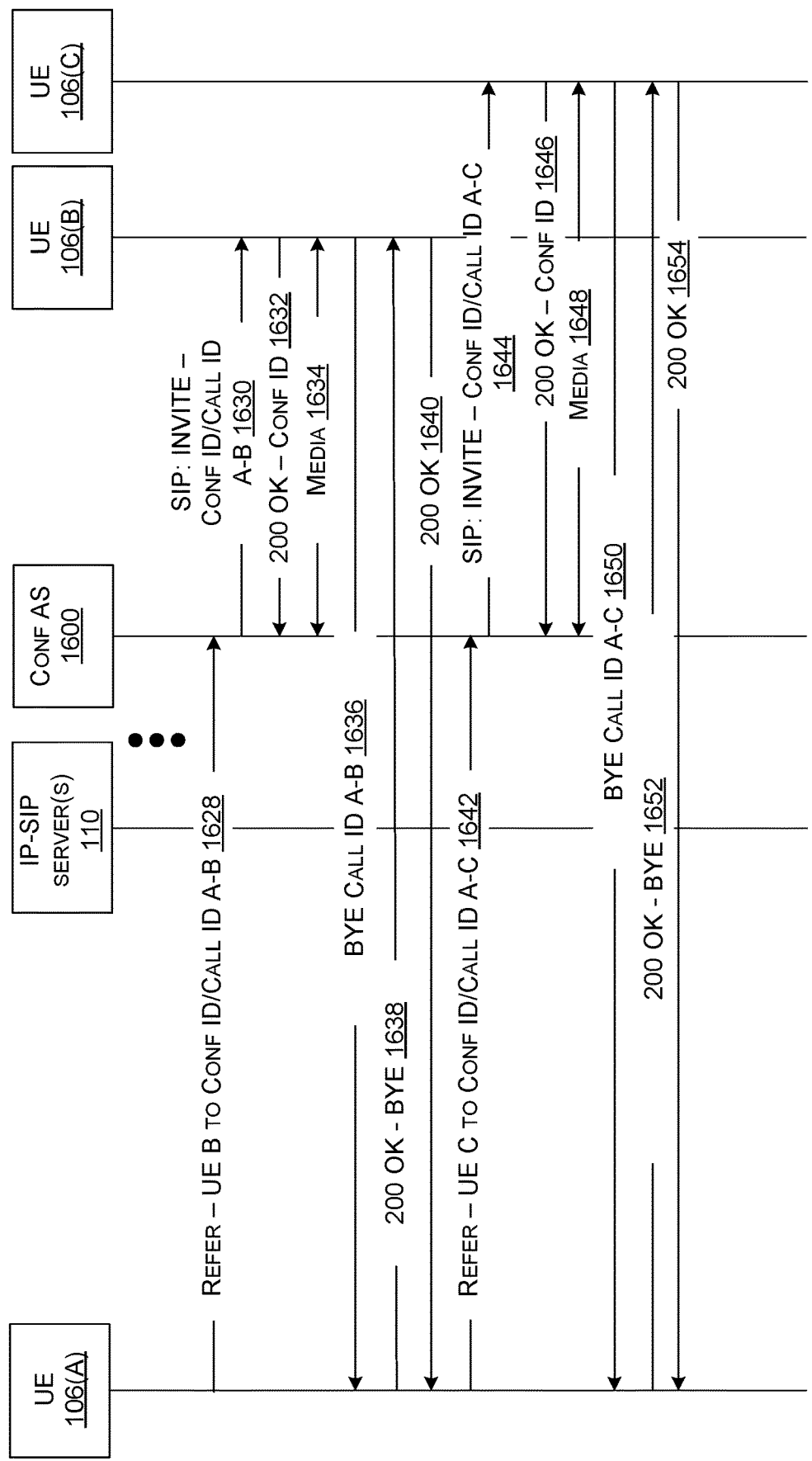

FIGS. 16A and 16B are, collectively, a diagram illustrating example signaling between multiple UEs 106, IP-SIP server(s) 110, and a conference application server (AS) 1600 while a first UE 106(A) is requesting establishment of a communication session with two other UEs 106(B) and 106(C) (e.g., to establish a conference call). As shown in FIG. 16A, initially, the first UE 106(A) may generate and send a SIP INFO request 1602 to request a PHY IP address 300 associated with a second UE 106(B). The SIP INFO request 1602 may be sent over the telecommunications network 102 to the IP-SIP server(s) 110. The SIP INFO request 1602 may include a PHY IP address 300 and a VIP address 302 of the first UE 106(A), a VIP address 302 of the second UE 106(B), a registration security key, and/or MSISDNs of the first UE 106(A) and the second UE 106(B).

The IP-SIP server(s) 110 may receive the SIP INFO request 1602, and the IP routing component 720 of the IP-SIP server(s) 110 may extract the information from the SIP INFO request 1602 to determine the PHY IP address 300 of the second UE 106(B). For example, the IP routing component 720 of the IP-SIP server(s) 110 may attempt to identify the VIP address 302 of the second UE 106(B) in the registration state table 900 based at least in part on information included in the SIP INFO request 1602. The IP routing component 720 of the IP-SIP server(s) 110 can retrieve the PHY IP address 300 for the second UE 106(B), and send a SIP INFO response 1604 to the first UE 106(A) that includes the PHY IP address 300 for the second UE 106(B).

The first UE 106(A) can use the PHY IP address 300 for the second UE 106(B) to generate and send a SIP request 1606 (e.g., a session request, such as a SIP INVITE) to the second UE 106(B). The SIP request 1606 can be sent over the telecommunications network 102 to second UE 106(B).

The second UE 106(B) may receive the SIP request 1606, and may respond with various SIP messages (e.g., a 183 Session Progress message, a 180 Ringing message, etc.), and, ultimately, a 200 OK message 1608. The first UE 106(A) may receive the 200 OK message 1608 to indicate to the first UE 106(A) that a communication session between the first UE 106(A) and the second UE 106(B) has been successfully established. The first and second UEs 106(A) and 106(B) can communicate media 1610 directly between each other, via the telecommunications network 102.

The first UE 106(A) may send a SIP request 1612 to place the established communication session on hold, and the second UE 106(B) may respond with a 200 OK message 1612.

With the two-way communication session placed on hold, the first UE 106(A) may generate and send a second SIP INFO request 1614 to request a PHY IP address 300 associated with a third UE 106(C). The SIP INFO request 1614 may be sent over the telecommunications network 102 to the IP-SIP server(s) 110. The SIP INFO request 1614 may include a PHY IP address 300 and a VIP address 302 of the first UE 106(A), a VIP address 302 of the third UE 106(C), a registration security key, and/or MSISDNs of the first UE 106(A) and the third UE 106(C).

The IP-SIP server(s) 110 may receive the second SIP INFO request 1614, and the IP routing component 720 of the IP-SIP server(s) 110 may extract the information from the second SIP INFO request 1614 to determine the PHY IP address 300 of the third UE 106(C). For example, the IP routing component 720 of the IP-SIP server(s) 110 may attempt to identify the VIP address 302 of the third UE 106(C) in the registration state table 900 based at least in part on information included in the second SIP INFO request 1614. The IP routing component 720 of the IP-SIP server(s) 110 can retrieve the PHY IP address 300 for the third UE 106(C), and send a second SIP INFO response 1616 to the first UE 106(A) that includes the PHY IP address 300 for the third UE 106(C).

The first UE 106(A) can use the PHY IP address 300 for the third UE 106(C) to generate and send a second SIP request 1618 (e.g., a session request, such as a SIP INVITE) to the third UE 106(C). The second SIP request 1618 can be sent over the telecommunications network 102 to the third UE 106(C).

The third UE 106(C) may receive the second SIP request 1618 and may respond with various SIP messages (e.g., a 183 Session Progress message, a 180 Ringing message, etc.), and, ultimately, a 200 OK message 1620. The first UE 106(A) may receive the 200 OK message 1620 to indicate to the first UE 106(A) that a communication session between the first UE 106(A) and the third UE 106(C) has been successfully established. The first UE 106(A) may send a SIP request 1622 to the conference AS 1600. The SIP request 1622 may be a session request (e.g., a SIP INVITE) to establish a conference call. The conference AS 1600 may respond with a 200 OK message 1624 that includes a conference ID for the conference communication session. The first UE 106(A) and the conference AS 1600 can communicate media 1626 directly between each other, via the telecommunications network 102.

Continuing with reference to FIG. 16B, the first UE 106(A) may send a refer message 1628 to the conference AS 1600 to request that the conference AS 1600 setup a conference call for the second UE 106(B). This refer message 1628 may include the conference ID for the conference communication session, and a call ID of the previously-established communication session between the first and second UEs 106(A) and 106(B). The conference AS 1600 may send a SIP request 1630 (e.g., a session request, such as a SIP INVITE) to request establishment of a conference communication session with the second UE 106(B). This SIP request 1630 may include the conference ID for the conference communication session, and a call ID of the previously-established communication session between the first and second UEs 106(A) and 106(B).

The second UE 106(B) may receive the SIP request 1630 from the conference AS 1600, and may respond with a 200 OK message 1632 to the conference AS 1600. The second UE 106(B) and the conference AS 1600 can communicate media 1634 directly between each other, via the telecommunications network 102.

The second UE 106(B) may send a BYE message 1636 to the first UE 106(A) to terminate the previously-established two-way communication session between the first and second UEs 106(A) and 106(B). The first UE 106(A) may respond with a 200 OK message 1638 that is sent to, and received by, the second UE 106(B). The second UE 106(B) may respond with a 200 OK message 1640, which, when received by the first UE 106(A), indicates to the first UE 106(A) that the previously-established two-way communication session between the first and second UEs 106(A) and 106(B) has been successfully terminated.

The first UE 106(A) may send a second refer message 1642 to the conference AS 1600 to request that the conference AS 1600 setup a conference call for the third UE 106(C). This refer message 1642 may include the conference ID for the conference communication session, and a call ID of the previously-established communication session between the first and third UEs 106(A) and 106(C). The conference AS 1600 may send a SIP request 1644 (e.g., a session request, such as a SIP INVITE) to request establishment of a conference communication session with the third UE 106(C). This SIP request 1644 may include the conference ID for the conference communication session, and a call ID of the previously-established communication session between the first and third UEs 106(A) and 106(C).

The third UE 106(C) may receive the SIP request 1644 from the conference AS 1600, and may respond with a 200 OK message 1646 to the conference AS 1600. The third UE 106(C) and the conference AS 1600 can communicate media 1648 directly between each other, via the telecommunications network 102.

The third UE 106(C) may send a BYE message 1650 to the first UE 106(A) to terminate the previously-established two-way communication session between the first and third UEs 106(A) and 106(C). The first UE 106(A) may respond with a 200 OK message 1652 that is sent to, and received by, the third UE 106(C). The third UE 106(C) may respond with a 200 OK message 1654, which, when received by the first UE 106(A), indicates to the first UE 106(A) that the previously-established two-way communication session between the first and third UEs 106(A) and 106(C) has been successfully terminated. Thereafter, the conference communication session is established and the multiple UEs 106 can communicate media between each other via the conference AS 1600, and over the telecommunications network 102. It is to be appreciated that more than three UEs 106 can establish a conference communication session by iterating particular operations of FIGS. 16A and 16B for additional UEs 106.

It is to be appreciated that the arrangement of the signaling shown in FIG. 12, FIG. 13, FIG. 14, FIG. 15, and FIGS. 16A and 16B is not necessarily meant to depict a particular order of the signaling that is to take place. With this in mind, any given signal shown in these individual figures may occur before, during, or after any of the other specific signaling that is shown in these individual figures. The signaling shown in these figures is also not meant to be limiting on the signaling that can take place when implementing the techniques and systems described herein, such that particular signaling may be omitted, and additional signaling may be added to the signaling diagrams shown in these figures.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 17:
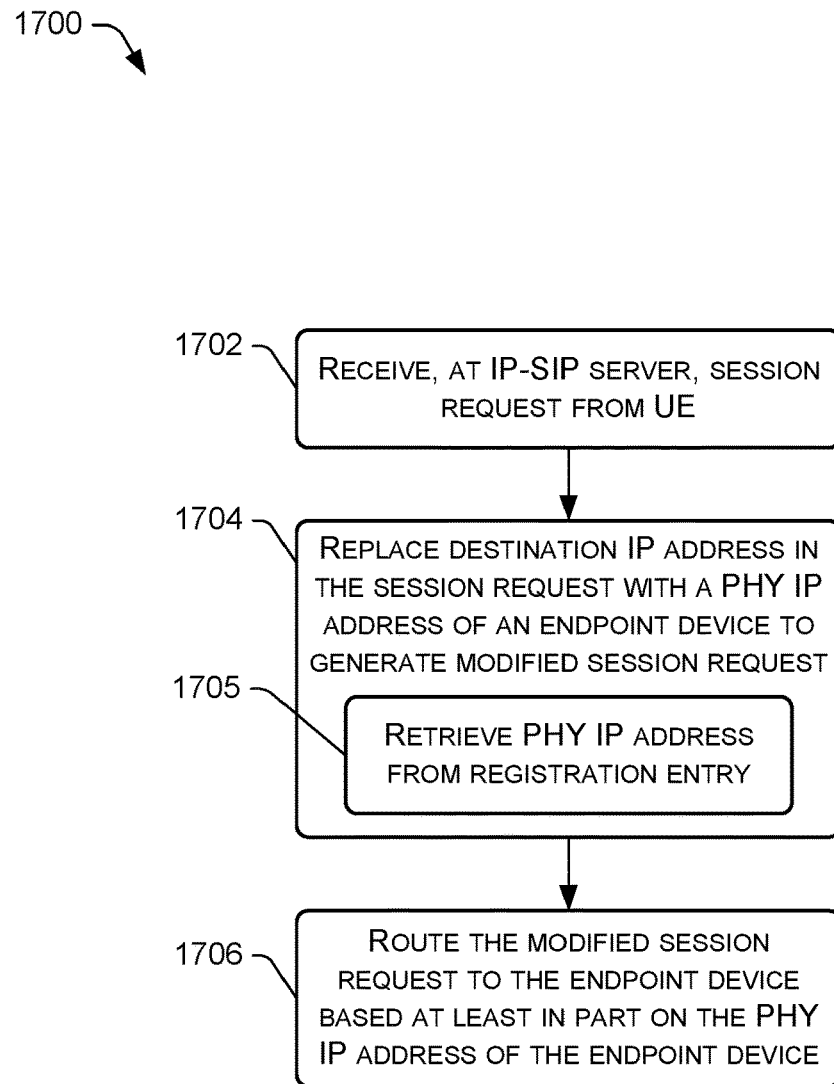
FIG. 17 illustrates a flowchart of an example process implemented by IP-SIP server(s) for routing an incoming session request based at least in part on an IP address.

FIG. 17 illustrates a flowchart of an example process 1700 implemented by IP-SIP server(s) 110 for routing an incoming session request based at least in part on an IP address. For discussion purposes, the process 1700 is discussed with reference to the previous figures.

At 1702, the IP-SIP server(s) 110 may receive a session request 502 (e.g., a SIP request, such as the SIP request 1302, 1402, 1502) from a UE over a telecommunications network 102. The session request 502 may be a request to establish a communication session (e.g., a SIP INVITE). In some embodiments, receiving the session request at block 1702 is based at least in part on the IP-SIP server(s) 110 having previously advertised a portion of a VIP address 302 associated with the requested network service 802. For example, if the session request is for a voice calling service (network service 802), a portion (e.g., network portion) of the VIP address 302 associated with that voice calling service may have been advertised to a network-accessible location, allowing the UE 106 to send the session request 502 to the IP-SIP server(s) 110 at block 1702.

At 1704, the IP routing component 720 of the IP-SIP server(s) 110 may replace a destination IP address 500 in the session request 502 with a PHY IP address 300 of an endpoint device to generate a modified session request. In some embodiments, the destination IP address 500 is a VIP address 302 of another UE 106(B), or some other endpoint device. In some embodiments, the destination IP address 500 corresponds to a particular network service 802 (e.g., an IMS-based service).

As shown by the sub-block 1705, the replacement operation at block 1704 may include retrieving the PHY IP address 300 of the endpoint device from a registration entry. For example, a registration state table 900 may be maintained by the IP-SIP server(s) 110, and may include a registration entry with the PHY IP address 300 of the endpoint device.

At 1706, IP routing component 720 of the IP-SIP server(s) 110 may route the modified session request to the endpoint device based at least in part on the PHY IP address 300 of the endpoint device, such as by routing the modified session request over the telecommunications network 102. In some embodiments, this modified session request is sent directly from the IP-SIP server(s) 110 to the endpoint device (e.g., a second UE 106(B)). In some embodiments, the routing operation at block 1706 may comprise routing the modified session request to the endpoint device indirectly, such as via one or more additional network nodes 112. In emergency call scenario, for example, the IP-SIP server(s) 110 may route the modified session request through an E-CSCF node (and possibly additional network nodes) before the modified session request is received at the endpoint device (e.g., a PSAP).

Figure 18:
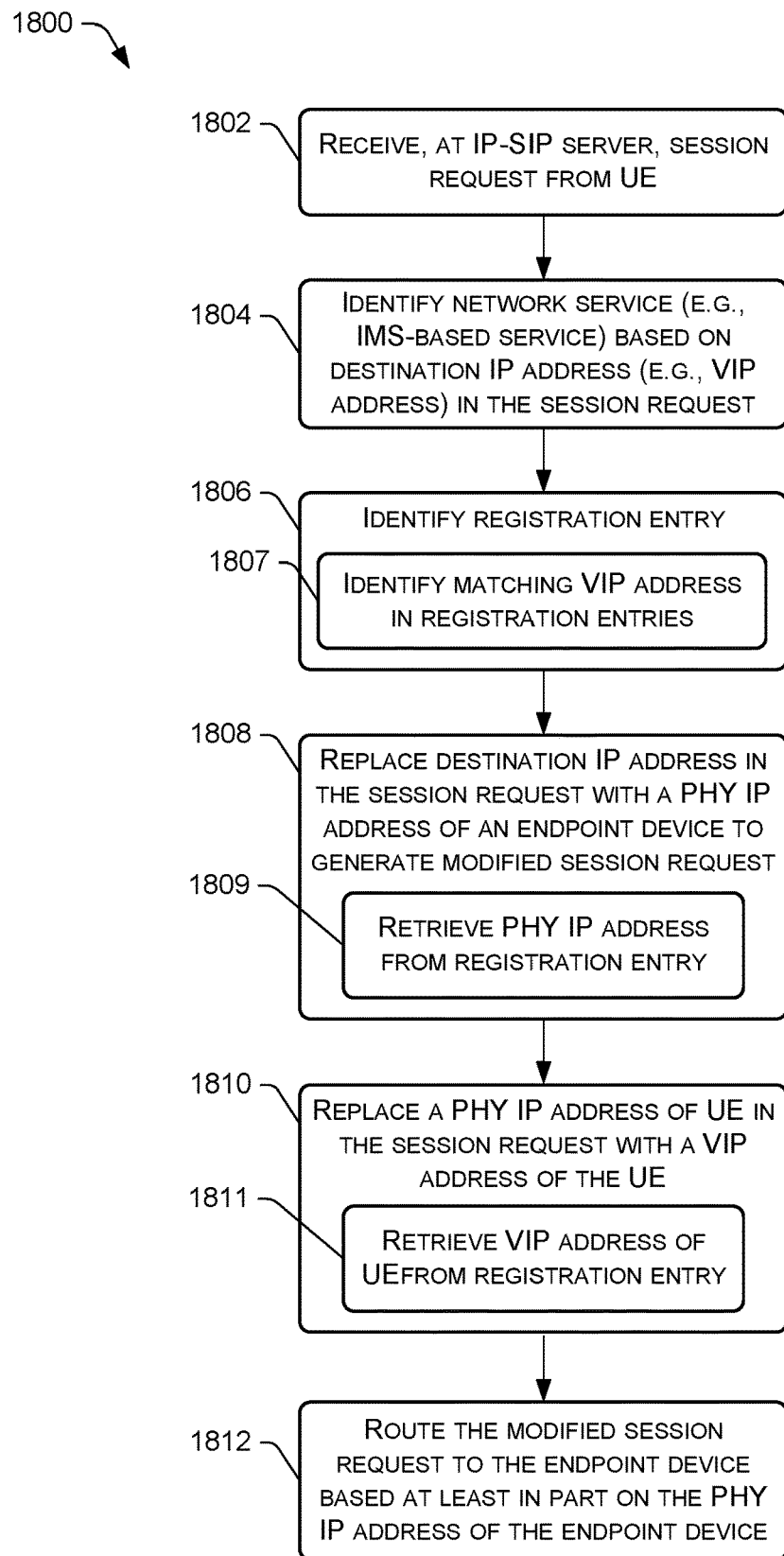
FIG. 18 illustrates a flowchart of a more detailed example process implemented by IP-SIP server(s) for routing an incoming session request based at least in part on an IP address.

FIG. 18 illustrates a flowchart of a more detailed example process 1800 implemented by IP-SIP server(s) 110 for routing an incoming session request based at least in part on an IP address. For discussion purposes, the process 1800 is discussed with reference to the previous figures.

At 1802, the IP-SIP server(s) 110 may receive a session request 502 (e.g., a SIP request, such as the SIP request 1302, 1402, 1502) from a UE over a telecommunications network 102.

At 1804, the IP routing component 720 of the IP-SIP server(s) 110 may identify a network service 802 (e.g., an IMS-based service) based on a destination IP address 500 in the session request 502. For example, the destination IP address 500 may be mapped to a network service 802 in the association data 722 (e.g., the network services mapping table 800) maintained by the IP-SIP server(s) 110.

At 1806, the IP routing component 720 of the IP-SIP server(s) 110 may identify a registration entry for routing the session request to an appropriate endpoint device. Identifying the registration entry at block 1806 may comprise identifying a registration entry associated with (or corresponding to) the identified network service 802.

As shown by sub-block 1807, the identifying of the registration entry at block 1806 may comprise identifying a matching VIP address 302 among multiple registration entries (e.g., in a registration state table 900) that matches a VIP destination address in the session request. For example, the destination IP address 500 in the session request may comprise a VIP address 302 (e.g., a VIP address 302 of an endpoint device, such as a second UE 106(B), or another endpoint device), and, assuming these endpoint devices are registered with the IP-SIP server(s) 110, their VIP addresses 302 can be identified by comparing the registered VIP addresses 302 against the destination IP address 500 in the session request.

At 1808, the IP routing component 720 of the IP-SIP server(s) 110 may replace the destination IP address 500 in the session request 502 with a PHY IP address 300 of an endpoint device to generate a modified session request.

Again, as shown by the sub-block 1809, the replacement operation at block 1808 may include retrieving the PHY IP address 300 of the endpoint device from a registration entry.

At 1810, the IP routing component 720 of the IP-SIP server(s) 110 may replace a PHY IP address 300 of the UE 106 in the session request 502 with a VIP address 302 of the UE 106. As shown by the sub-block 1811, this replacing operation at block 1810 may include retrieving the VIP address 302 of the UE 106 from a registration entry.

At 1812, IP routing component 720 of the IP-SIP server(s) 110 may route the modified session request to the endpoint device based at least in part on the PHY IP address 300 of the endpoint device, such as by routing the modified session request over the telecommunications network 102.

Figure 19:
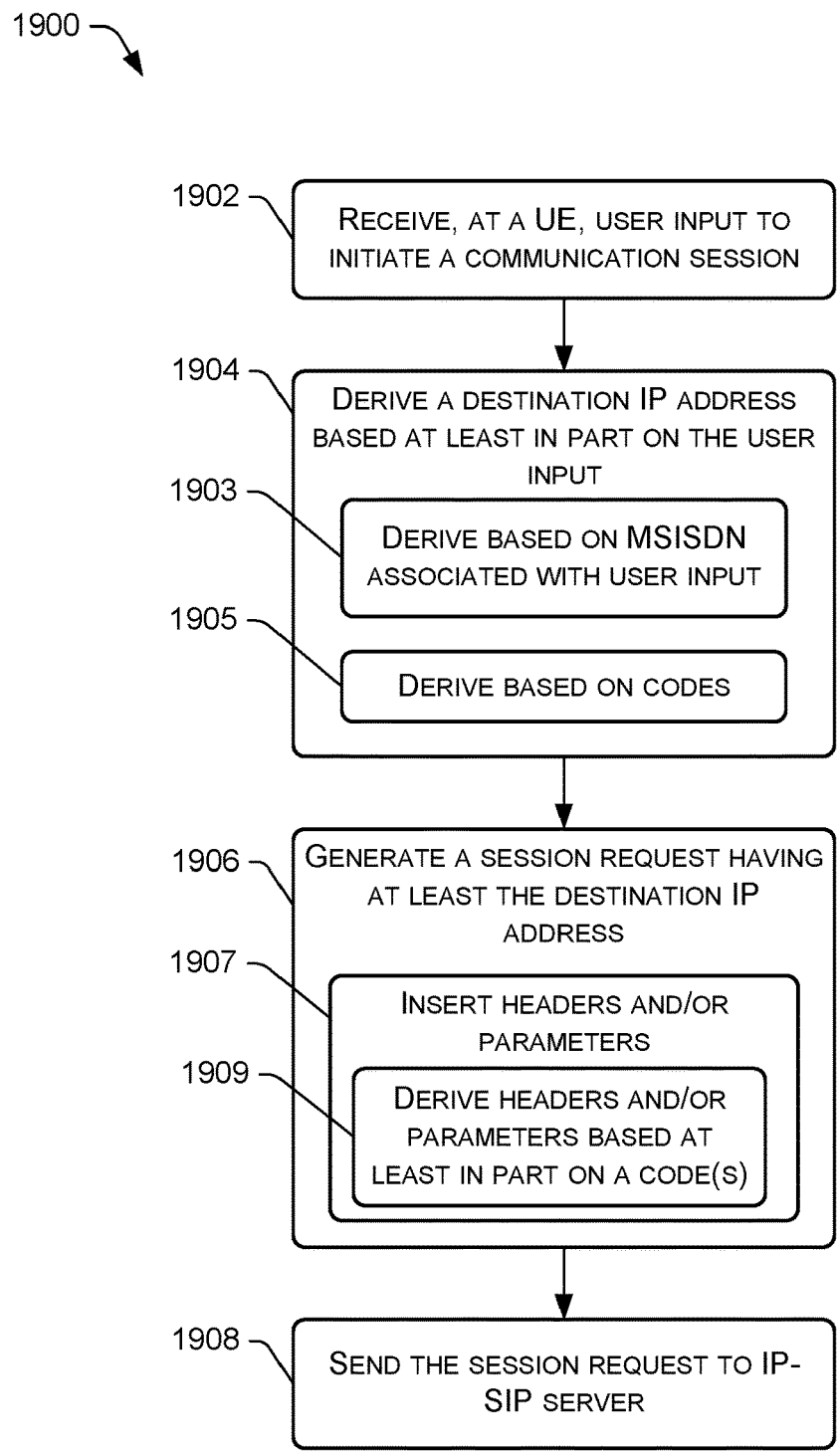
FIG. 19 illustrates a flowchart of an example process implemented by a UE for establishing a communication session based on a UE-derived destination IP address.

FIG. 19 illustrates a flowchart of an example process 1900 implemented by a UE for establishing a communication session based on a UE-derived destination IP address. For discussion purposes, the process 1900 is discussed with reference to the previous figures.

At 1902, a UE 106 may receive user input to initiate a communication session. For example, a user 104 may dial a telephone number of a second user 104(B), which may correspond to a MSISDN associated with a second UE 106(B). As another example, the user 104 may dial an emergency short code (e.g., 911 in the United States). As another example, the user 104 may compose a SMS text message that is to be sent to a second UE 106(B) of a second user 104(B).

At 1904, derive a destination IP address 500 based at least in part on the user input. As shown by sub-block 1903, the destination IP address 500 may be derived based on a MSISDN associated with the user input, such as a MSISDN associated with a second UE 106(B). As shown by sub-block 1905, the destination IP address 500 may be derived based on one or more codes 222 available in local memory of the UE 106, which may have been previously received from the IP-SIP server(s) 110. For example, if the destination IP address 500 represents a VIP address 302 of a second UE 106(B), the VIP address 302 of the second UE 106(B) may be derived at sub-block 1905 based on the UE IP code 222(1) and the UE network code 222(2), as described above with reference to FIG. 3. As another example, if the UE 106 determines that the user input corresponds to a particular network service 802, the UE 106 may derive the destination IP address 500 based on the service network code 222(3) and the SIP code 222(4), as described above with reference to FIG. 5.

At 1906, the UE 106 may generate a session request 502 having at least the destination IP address 500 derived at block 1904. As shown by sub-block 1907, the UE 106 may insert headers and/or parameters into the session request 502, which, as shown by sub-block 1909, may be derived based on one or more codes 222 available in local memory of the UE 106. FIG. 6 shows an example technique of inserting headers and/or parameters into a session request 502, the headers and/or parameters having been derived based on one or more of the codes 222(1)-(4).

At 1908, the UE 106 may send the session request 502 over a telecommunications network to the IP-SIP server(s) 110 for establishing the communication session with an endpoint device.

Figure 20:
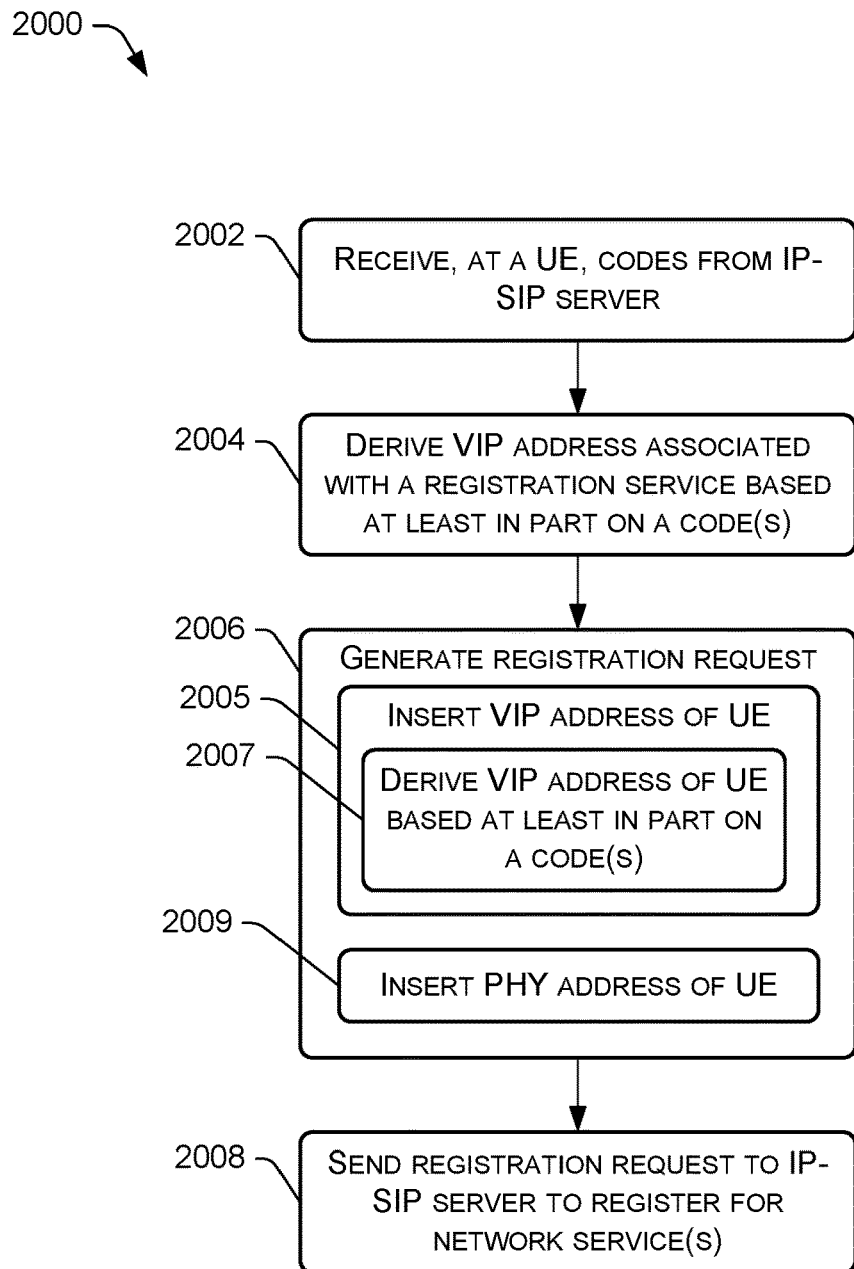
FIG. 20 illustrates a flowchart of an example process implemented by a UE for registering for network service(s).

FIG. 20 illustrates a flowchart of an example process implemented by a UE for registering for network service(s). For discussion purposes, the process 2000 is discussed with reference to the previous figures.

At 2002, a UE 106 may receive codes 222 from the IP-SIP server(s) 110. For example, the UE 106 may receive an application update with the codes 222.

At 2004, the UE 106 may derive a VIP address 302 associated with a registration service (a network service 802). This may be done algorithmically by the UE 106, such as by using the technique shown in FIG. 5 using a subset of the codes 222.

At 2006, the UE 106 may generate a registration request 402. As shown by sub-block 2005, the UE 106 may insert a VIP address 302 of the UE 106 in the registration request 402, which, as shown by sub-block 2007, may be derived based at least in part on a subset of the codes 222. For example, the technique described above with reference to FIG. 3 can be used to derive the VIP address 302 of the UE 106 based on the UE IP code 222(1) and the UE network code 222(2), and further based on the MSISDN of the UE 106. As shown by the sub-block 2009, the UE 106 may also insert a PHY IP address 300 of the UE 106 in the registration request 402.

At 2008, the UE 106 may send the registration request 402 over the telecommunications network 102 to the IP-SIP server(s) 110 for registration of one or more network services 802.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A user equipment (UE) comprising:
one or more processors; and
one or more memories storing computer-executable instructions that, when executed by the one or more processors, cause the UE to:
receive user input to initiate a communication session;
derive a destination Internet Protocol (IP) address based at least in part on a mobile station international subscriber directory number (MSISDN) associated with the user input and a virtual IP (VIP) address of a destination UE derived by the UE based at least in part on the MSISDN;
generate a session request having at least the destination IP address; and
send the session request over a telecommunications network to a server.

2. The UE of claim 1, wherein deriving the destination IP address is further based on codes stored in the one or more memories of the UE.

3. The UE of claim 1, wherein the computer-executable instructions, when executed by the one or more processors, further cause the UE to, prior to receiving the user input:
generate a registration request having:
a virtual IP (VIP) address of the UE; and
a physical (PHY) IP address of the UE; and
send the registration request over the telecommunications network to the server.

4. The UE of claim 3, wherein the computer-executable instructions, when executed by the one or more processors, further cause the UE to, prior to generating the registration request:
receive a first code and a second code from the server; and
derive the VIP address of the UE based at least in part on the first code and the second code.

5. The UE of claim 1, wherein the computer-executable instructions, when executed by the one or more processors, further cause the UE to:
receive codes from the server prior to receiving the user input; and
in response to the receiving of the user input, derive headers or parameters of the session request based at least in part on one or more of the codes received from the server.

6. The UE of claim 1, wherein the computer-executable instructions, when executed by the one or more processors, further cause the UE to:
receive a first code and a second code from the server, the first code associated with a network service; and
determine that the user input corresponds to a request to utilize the network service,
wherein deriving the destination IP address is further based on the first code and the second code.

7. The UE of claim 1, wherein deriving the destination IP address is further based on codes stored in the one or more memories of the UE, the codes including at least one of a UE IP code, a UE network code, a service network code, and/or a SIP code.

8. The UE of claim 1, wherein deriving the destination IP address is further based on utilizing at least a UE IP code and a UE network code based at least in part on determining that the destination IP address represents the VIP address of the destination UE.

9. The UE of claim 1, wherein deriving the destination IP address is further based on utilizing at least a service network code and a SIP code based at least in part on determining that the user input corresponds to a particular network service.

10. A computer-implemented method comprising:
receiving, by a user equipment (UE), user input to initiate a communication session;
deriving, by the UE, a destination Internet Protocol (IP) address by deriving a virtual IP (VIP) address of a destination UE based at least in part on the user input corresponding to a mobile station international subscriber directory number (MSISDN) associated with the destination UE;
generating, by the UE, a Session Initiation Protocol (SIP) request having at least the destination IP address; and
sending, by the UE and over a telecommunications network to a server, the SIP request for establishing the communication session with an endpoint device.

11. The computer-implemented method of claim 10, wherein deriving the destination IP address is based at least in part on codes stored in local memory of the UE.

12. The computer-implemented method of claim 11, further comprising, prior to the receiving of the user input:
receiving the codes, including a first code and a second code, from the server, the first code associated with a network service; and
determining that the user input corresponds to a request to utilize the network service,
wherein the deriving of the destination IP address is based at least in part on the first code and the second code.

13. The computer-implemented method of claim 10, further comprising, prior to the receiving of the user input:
generating a registration request having:
a virtual IP (VIP) address of the UE; and
a physical (PHY) IP address of the UE; and
sending the registration request over the telecommunications network to the server.

14. The computer-implemented method of claim 13, further comprising, prior to generating the registration request:
receive a first code and a second code from the server; and
derive the VIP address of the UE based at least in part on the first code and the second code.

15. The computer-implemented method of claim 10, further comprising:
receive codes from the server prior to receiving the user input; and
in response to the receiving of the user input, derive headers or parameters of the session request based at least in part on one or more of the codes received from the server.

16. A system including a user equipment (UE) comprising:
one or more processors; and
one or more memories storing computer-executable instructions that, when executed by the one or more processors, cause the UE to:
receive user input to initiate a communication session;
derive a destination Internet Protocol (IP) address based at least in part on a mobile station international subscriber directory number (MSISDN) associated with the user input and a virtual IP (VIP) address of a destination UE derived by the UE based at least in part on the MSISDN;
generate a session request having at least the destination IP address; and
send the session request over a telecommunications network to a server.

17. The system of claim 16, wherein deriving the destination IP address is further based on codes stored in the one or more memories of the UE.

18. The system of claim 16, wherein the computer-executable instructions, when executed by the one or more processors, further cause the UE to, prior to receiving the user input:
generate a registration request having:
a virtual IP (VIP) address of the UE; and
a physical (PHY) IP address of the UE; and
send the registration request over the telecommunications network to the server.

19. The system of claim 18, wherein the computer-executable instructions, when executed by the one or more processors, further cause the UE to, prior to generating the registration request:
receive a first code and a second code from the server; and
derive the VIP address of the UE based at least in part on the first code and the second code.

20. The system of claim 16, wherein the computer-executable instructions, when executed by the one or more processors, further cause the UE to:
receive codes from the server prior to receiving the user input; and
in response to the receiving of the user input, derive headers or parameters of the session request based at least in part on one or more of the codes received from the server.

* * * * *